US010075081B2

(12) United States Patent
Kikuchi et al.

(10) Patent No.: US 10,075,081 B2
(45) Date of Patent: Sep. 11, 2018

(54) INSULATED SYNCHRONOUS RECTIFICATION DC/DC CONVERTER

(71) Applicant: ROHM CO., LTD., Ukyo-Ku, Kyoto (JP)

(72) Inventors: Hiroki Kikuchi, Kyoto (JP); Ryo Shimizu, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 198 days.

(21) Appl. No.: 15/059,445

(22) Filed: Mar. 3, 2016

(65) Prior Publication Data

US 2016/0261204 A1 Sep. 8, 2016

(30) Foreign Application Priority Data

Mar. 3, 2015 (JP) ................. 2015-041611

(51) Int. Cl.
*H02M 3/335* (2006.01)
*H02M 1/32* (2007.01)

(52) U.S. Cl.
CPC ... *H02M 3/33523* (2013.01); *H02M 3/33592* (2013.01); *H02M 1/32* (2013.01); *Y02B 70/1475* (2013.01)

(58) Field of Classification Search
CPC ...... H02M 3/00; H02M 3/158; H02M 3/1588; H02M 3/22; H02M 3/24; H02M 3/28; H02M 3/325; H02M 3/335; H02M 3/3353; H02M 3/33507; H02M 3/33538; H02M 3/33546; H02M 3/33553; H02M 3/33523; H02M 3/33569; H02M 3/33576; H02M 3/33592; H02M 3/33515; H02M 1/08; H02M 1/32; H02M 1/325; H02M 1/327; H02M 1/36; H02M 2001/0009; H02M 2001/0029; H02M 2001/0032; (Continued)

(56) References Cited

U.S. PATENT DOCUMENTS 8,520,415 B1 * 8/2013 Krishnamoorthy ........................ H02M 3/33523 363/21.07
2004/0125621 A1 * 7/2004 Yang ................. H02M 3/33592 363/21.14
(Continued)

FOREIGN PATENT DOCUMENTS

JP 2010074959 A 4/2010

*Primary Examiner* — Timothy J Dole
*Assistant Examiner* — Carlos Rivera-Perez
(74) *Attorney, Agent, or Firm* — Cantor Colburn LLP

(57) ABSTRACT

An external circuit element $R_{SET}$ is connected in use to an SET terminal. A synchronous rectification controller generates a pulse signal S1 based on a control time determined according to the state of the SET terminal. A driver switches on and off the synchronous rectification transistor according to the pulse signal S1. An abnormal state detection circuit is capable of detecting an open-circuit state and/or a short-circuit state that can occur in the SET terminal. When the abnormal state detection circuit detects such an open-circuit state and/or short-circuit state, the abnormal state detection circuit asserts a detection signal S11. When the detection signal S11 is asserted, a primary-side controller arranged on the primary side of the DC/DC converter is instructed to suspend the switching operation of a switching transistor.

23 Claims, 21 Drawing Sheets

(58) Field of Classification Search
CPC . H02M 2001/0038; H02M 2001/0048; H02M 2001/0054; Y02B 70/1458; Y02B 70/1475
USPC .... 363/15–21.18, 37, 38, 40–48, 50–58, 84, 363/86, 88, 89, 95–99, 106, 108, 109, 363/114, 115, 123–134, 146, 147; 323/205–211, 222–226, 271–278, 323/282–288, 294, 297, 298, 318, 323/351–354, 902, 907, 908, 909; 361/18, 78–92, 93.1, 93.7, 93.8, 94–101, 361/103, 106
See application file for complete search history.

(56) References Cited

U.S. PATENT DOCUMENTS

| | | | | |
|---|---|---|---|---|
| 2010/0085675 | A1* | 4/2010 | Oki | H02M 1/08 361/101 |
| 2011/0102411 | A1* | 5/2011 | Chang | G09G 3/3406 345/212 |
| 2015/0326008 | A1* | 11/2015 | Baurle | H02H 1/0084 361/87 |

* cited by examiner

INSULATED SYNCHRONOUS RECTIFICATION DC/DC CONVERTER

CROSS-REFERENCE TO RELATED APPLICATIONS

This application is based upon and claims the benefit of priority from the prior Japanese Patent Application No. 2015-041611, filed Mar. 3, 2015, the entire contents of which are incorporated herein by reference.

BACKGROUND OF THE INVENTION

Field of the Invention

The present invention relates to an insulated synchronous rectification DC/DC converter.

Description of the Related Art

Various kinds of consumer electronics devices such as TVs, refrigerators, etc., each operate receiving commercial AC electric power from an external circuit. Also, electronic devices such as laptop computers, cellular phone terminals, and tablet PCs are each configured to operate using commercial AC electric power, and/or to be capable of charging a built-in battery using such commercial AC electric power. Such consumer electronics devices and electronic devices (which will collectively be referred to as "electronic devices" hereafter) each include a built-in power supply apparatus (AC/DC converter) that performs AC/DC conversion of commercial AC voltage. Alternatively, in some cases, such an AC/DC converter is built into an external power supply adapter (AC adapter) for such an electronic device.

FIG. 1 is a block diagram showing an AC/DC converter 100r investigated by the present inventor. The AC/DC converter 100r mainly includes a filter 102, a rectifier circuit 104, a smoothing capacitor 106, and a DC/DC converter 200r.

The commercial AC voltage $V_{AC}$ is input to the filter 102 via a fuse and an input capacitor (not shown). The filter 102 removes noise included in the commercial AC voltage $V_{AC}$. The rectifier circuit 104 is configured as a diode bridge circuit which performs full-wave rectification of the commercial AC voltage $V_{AC}$. The output voltage of the rectifier circuit 104 is smoothed by the smoothing capacitor 106, thereby generating a converted DC voltage $V_{IN}$.

An insulated DC/DC converter 200r receives the DC voltage $V_{IN}$ via an input terminal P1, steps down the DC voltage $V_{IN}$ thus received so as to generate an output voltage $V_{OUT}$ stabilized to a target value, and supplies the output voltage $V_{OUT}$ thus stabilized to a load (not shown) connected between an output terminal P2 and a ground terminal P3.

The DC/DC converter 200r includes a primary-side controller 202, a photocoupler 204, a shunt regulator 206, an output circuit 210, a secondary-side controller 300r, and other circuit components. The output circuit 210 includes a transformer T1, a diode D1, an output capacitor C1, a switching transistor M1, and a synchronous rectification transistor M2. The output circuit 210 has the same topology as those of typical synchronous rectification flyback converters, and accordingly description thereof will be omitted.

The switching transistor M1 connected to the primary winding W1 of the transformer T1 performs switching so as to step down the input voltage $V_{IN}$, thereby generating the output voltage $V_{OUT}$. With such an arrangement, the primary-side controller 202 adjusts the duty ratio of the switching of the switching transistor M1.

The output voltage $V_{OUT}$ of the DC/DC converter 200r is divided by means of resistors R1 and R2. The cathode (K) terminal of the shunt regulator 206 is connected to a light-emitting element (light-emitting diode) on the input side of the photocoupler 204. The anode (A) terminal of the shunt regulator 206 is grounded. The divided voltage (voltage detection signal) $V_{OUT\_S}$ is input to a reference (REF) terminal of the shunt regulator 206. The shunt regulator 206 includes an error amplifier that amplifies the difference between the voltage detection signal $V_{OUT\_S}$ and a reference voltage $V_{REF}$ (not shown) so as to generate an error current $I_{ERR}$ that corresponds to the difference, which is drawn (as a sink current) via the light-emitting element (light-emitting diode) on the input side of the photocoupler 204.

A feedback current $I_{FB}$ flows through a light-receiving element (phototransistor) on the output side of the photocoupler 204 according to the error current $I_{ERR}$ that flows on the secondary side. The feedback current $I_{FB}$ is smoothed by means of a resistor and a capacitor, and is input to a feedback (FB) terminal of the primary-side controller 202. The primary-side controller 202 adjusts the duty ratio of the switching transistor M1 based on the voltage (feedback voltage) $V_{FB}$ at the FB terminal.

The secondary-side controller 300r switches on and off the synchronous rectification transistor M2 in synchronization with the switching of the switching transistor M1. The secondary-side controller 300r includes a synchronous rectification controller 304 and a driver 306. The synchronous rectification controller 304 generates a pulse signal S1 in synchronization with the switching of the switching transistor M1. For example, when the switching transistor M1 turns off, the synchronous rectification controller 304 sets the pulse signal S1 to a first state (e.g., high level) configured as an instruction to turn on the synchronous rectification transistor M2. When the secondary current $I_S$ that flows through the secondary winding W2 becomes substantially zero in an on period of the synchronous rectification transistor M2, the synchronous rectification controller 304 sets the pulse signal S1 to a second state (low level) configured as an instruction to turn off the synchronous rectification transistor M2.

The driver 306 switches on and off the synchronous rectification transistor M2 according to the pulse signal S1. The above is the overall configuration of the AC/DC converter 100r.

As a result of investigating the secondary-side controller 300r, the present inventors have come to recognize the following problems.

In order to generate the pulse signal S1, in many cases, the secondary-side controller 300r performs time measurement. The time measurement result may be used for edge blanking, a timing control operation for tuning on or turning off the synchronous rectification transistor M2, or a control operation for controlling the upper limit or the lower limit of the on time or the off time. Such a time period (which will be referred to as the "control time" hereafter) is required to be set as appropriate according to the time constant of the circuit elements of the output circuit 210. Accordingly, in many cases, the secondary-side controller 300r is configured to have a terminal (which will be referred to as the "SET terminal" hereafter) that allows the control time to be set via an external circuit.

In many cases, the SET terminal is connected to an external resistor or an external capacitor. With a typical example, a timer circuit is configured as a combination of a capacitor, a current source that charges the capacitor, and a voltage comparator that compares the voltage across the capacitor with a threshold voltage. With a configuration in which the SET terminal is connected to a setting resistor $R_{SET}$ configured as an external resistor, the current value generated by the current source may be adjusted according to the setting resistor $R_{SET}$. Alternatively, with such a configuration, the threshold voltage may be adjusted according to the setting resistor $R_{SET}$. Also, as an another configuration, the SET terminal may be connected to an external capacitor.

With the secondary-side controller 300r having such a SET terminal, if a short circuit (short circuit to a power supply or otherwise to the ground) or otherwise an open circuit occurs in the SET terminal due to dust or a fault in the mounting of the SET terminal, such an arrangement is not capable of measuring the control time with high precision. This leads to an abnormal operation of the synchronous rectification transistor M2.

SUMMARY OF THE INVENTION

The present invention has been made in order to solve such a problem. Accordingly, it is an exemplary purpose of an embodiment of the present invention to provide a secondary-side controller which is capable of preventing an abnormal operation thereof.

An embodiment of the present invention relates to a secondary-side controller that is arranged on a secondary side of an insulated synchronous rectification DC/DC converter, and that controls a synchronous rectification transistor. The secondary-side controller comprises: a set terminal that is connected in use to an external circuit element; a synchronous rectification controller that generates a pulse signal based on a control time determined according to a state of the set terminal; a driver that switches on and off the synchronous rectification transistor according to the pulse signal; and an abnormal state detection circuit that is capable of detecting an open-circuit state and/or a short-circuit state that can occur in the set terminal, and that asserts a detection signal upon detection of such an open-circuit state and/or a short-circuit state. When the detection signal is asserted, the secondary-side controller instructs a primary-side controller arranged on a primary side of the DC/DC converter to suspend a switching operation of a switching transistor.

With such an embodiment, when abnormal measurement of the control time occurs due to the set terminal being in an open-circuit state or a short-circuit state, the primary-side controller is notified of this so as to suspend the switching operation. Such an arrangement is capable of suppressing a malfunction, thereby providing improved reliability.

Also, the secondary-side controller may further comprise: a fail terminal connected in use to an input side of a fail notification photocoupler; and a fail circuit that drives the fail notification photocoupler connected to the fail terminal when the detection signal is asserted. Also, the primary-side controller may suspend the switching operation of the switching transistor according to a state of an output side of the fail notification photocoupler.

Also, the secondary-side controller may further comprise: a shunt regulator output terminal connected in use to an input side of a feedback photocoupler; a shunt regulator that generates an error current that corresponds to an output voltage of the DC/DC converter, and that supplies the error current thus generated to the feedback photocoupler connected to the shunt regulator output terminal; and a fail circuit that drives the feedback photocoupler connected to the shunt regulator output terminal when the detection signal is asserted.

In this case, the feedback photocoupler is also used as a fail notification photocoupler, thereby allowing the number of circuit elements to be reduced.

Also, an external resistor may be connected in use to the set terminal. Also, the abnormal state detection circuit may comprise: a first capacitor; a charger circuit that charges the first capacitor using a first current that is inversely proportional to a resistance value of the resistor; a discharger circuit that discharges the first capacitor with a predetermined second current; and an open circuit detection comparator that compares a voltage across the first capacitor with a threshold voltage set for detecting an open circuit.

When an open circuit occurs in the set terminal, the first current becomes zero. In this state, the first capacitor is discharged with the second current, which reduces the voltage across the first capacitor. Thus, such an arrangement is capable of detecting an open-circuit fault based on the voltage across the first capacitor.

Also, the abnormal state detection circuit may further comprise a short circuit detection comparator that compares a voltage at the set terminal with a threshold voltage set for detecting a short circuit.

When the set terminal is short-circuited to the ground, the voltage at the set terminal falls to a voltage in the vicinity of 0 V. On the other hand, when the set terminal is short-circuited to the power supply, the voltage at the set terminal rises to a voltage in the vicinity of the power supply voltage. Thus, such an arrangement is capable of detecting, based on the voltage at the set terminal, a short-circuit fault including a fault in which the set terminal is short-circuited to the ground and a fault in which the set terminal is short-circuited to the power supply.

Also, when the detection signal remains in an asserted state for a predetermined period of time, the fail circuit may drive a photocoupler to be driven. Such an arrangement is capable of masking an assertion of the detection signal when it occurs for only a very short period of time. Thus, such an arrangement is capable of preventing false detection of the short-circuit state and the open-circuit state.

Also, the fail circuit may comprise: a second capacitor; a current source that charges the second capacitor; a discharger transistor that is arranged in parallel with the second capacitor, and that is turned on when the detection signal is negated; and a voltage comparator that asserts a fail signal when a voltage across the second capacitor exceeds a threshold voltage. Also, the secondary-side controller may drive the photocoupler to be driven, in response to assertion of the fail signal.

Also, when the fail signal is consecutively asserted a predetermined number of times, the fail circuit may drive the photocoupler to be driven.

Also, the synchronous rectification controller may comprise: a pulse generator that generates a pulse signal based on a voltage across both terminals of the synchronous rectification transistor, that sets the pulse signal to an on level configured as an instruction to turn on the synchronous rectification transistor when the turn-off of the switching transistor arranged on the primary side of the DC/DC converter is detected, and that sets the pulse signal to an off level configured as an instruction to turn off the synchronous rectification transistor when it is detected that a current that flows through a secondary winding of a transformer becomes substantially zero; a driver that switches on and off the synchronous rectification transistor according to the pulse signal; and a forced turn-off circuit that forcibly turns off the synchronous rectification transistor after a predetermined time-up period elapses after the turn-on of the switching transistor is detected. Also, the control time may be configured as the time-up period.

The time-up period may be set to be shorter than the switching period of the switching transistor. In a case in which the switching frequency is configured as a variable frequency, the time-up period may be set to be shorter than the period that corresponds to the maximum frequency.

In a given cycle, the switching transistor is turned on and turned off, following which the synchronous rectification transistor is turned on. Such an embodiment ensures that, in the next cycle, the synchronous rectification transistor is turned off before the switching transistor is turned on, thereby solving a problem that can occur in the continuous mode.

Also, after the time-up period elapses after the turn-on of the switching transistor is detected, the forced turn-off circuit may switch the pulse signal to the off level.

This allows the synchronous rectification transistor to be forcibly turned off.

Also, the pulse generator may comprise: a set signal generating unit that generates a set signal which is asserted when the turn-off of the switching transistor is detected; a reset signal generating unit that generates a reset signal which is asserted when it is detected that the current that flows through the secondary winding of the transformer becomes substantially zero; and a flip-flop that generates the pulse signal which is switched to an on level when the set signal is asserted, and which is switched to an off level when the reset signal is asserted.

Also, the forced turn-off circuit may generate a forced turn-off signal which is asserted after the time-up period elapses after the turn-on of the switching transistor is detected. Also, when at least one from among the reset signal and the forced turn-off signal is asserted, the flip-flop may set the pulse signal to an off level.

Also, when the reset signal is asserted, the forced turn-off circuit may start time measurement.

In the continuous mode, the secondary current becomes zero as a result of the turn-on of the switching transistor. Thus, such an embodiment is capable of detecting, based on the assertion of the reset signal, whether or not the switching transistor turns on.

The set signal generating unit may comprise a first comparator that compares the voltage across both terminals of the synchronous rectification transistor with a first threshold voltage, and that outputs a set signal that corresponds to the comparison result. The reset signal generating unit may comprise a second comparator that compares the voltage across both terminals of the synchronous rectification transistor with a second threshold voltage, and that outputs a reset signal that corresponds to the comparison result.

Also, the secondary-side controller according to an embodiment may further comprise a third comparator that compares a voltage across both terminals of the synchronous rectification transistor with a third threshold voltage configured as a predetermined positive voltage. Also, when the voltage across both terminals of the synchronous rectification transistor crosses the third threshold voltage, the time measurement operation of the forced turn-off circuit may be reset.

When the synchronous rectification transistor is turned off in the discontinuous mode, the voltage across both terminals of the synchronous rectification transistor rises, following which resonance oscillation occurs in this voltage. With such an embodiment, by comparing the voltage across both terminals of the synchronous rectification transistor with the third threshold voltage, such an arrangement is capable of detecting such a rise in this voltage in the discontinuous mode. In the discontinuous mode, in this case, such an arrangement is capable of resetting time measurement, thereby overriding the forced turn-off function.

The third threshold voltage may be the output voltage of the DC/DC converter or otherwise a voltage that is offset with respect to the output voltage.

In the discontinuous mode, when the synchronous rectification transistor turns off, the voltage across both terminals of the synchronous rectification transistor rises, following which this voltage settles to the voltage level of the output voltage. Thus, by setting the third threshold voltage based on the output voltage, such an arrangement is capable of detecting the discontinuous mode in a sure manner.

Another embodiment of the present invention also relates to a secondary-side controller. The secondary-side controller comprises: a first comparator that compares a voltage across both terminals of the synchronous rectification transistor with a first threshold voltage, and that asserts a set signal when the voltage across both terminals of the synchronous rectification transistor becomes lower than the first threshold voltage; a second comparator that compares the voltage across both terminals of the synchronous rectification transistor with a second threshold voltage, and that asserts a reset signal when the voltage across both terminals of the synchronous rectification transistor becomes higher than the second threshold voltage; a flip-flop that generates a pulse signal which is switched to an on level when the set signal is asserted, and which is switched to an off level when the reset signal is asserted; a forced turn-off circuit that forcibly turns off the synchronous rectification transistor after a predetermined time-up period elapses after the reset signal is asserted; a set terminal that is connected in use to an external circuit element so as to determine the time-up period based on a circuit constant of the circuit element; and an abnormal state detection circuit that is capable of detecting an open-circuit state and/or a short-circuit state that can occur in the set terminal, and that asserts a detection signal upon detection of such an open-circuit state and/or short-circuit state. When the detection signal is asserted, the secondary-side controller instructs a primary-side controller arranged on a primary side of the DC/DC converter to suspend a switching operation of a switching transistor.

Also, the forced turn-off circuit may generate a forced turn-off signal which is asserted after the time-up period elapses after the reset signal is asserted. Also, when at least one from among the reset signal and the forced turn-off signal is asserted, the flip-flop may switch the pulse signal to an off level.

The secondary-side controller may further comprise a third comparator that compares the voltage across both terminals of the synchronous rectification transistor with a third threshold voltage having a predetermined positive voltage value. When the voltage across both terminals of the synchronous rectification transistor crosses the third threshold voltage, the time measurement operation of the forced turn-off circuit may be reset.

Also, the secondary-side controller may monolithically be integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

By monolithically integrating the circuit on a single chip, such an arrangement allows the circuit area to be reduced, and allows the circuit elements to have uniform characteristics.

Yet another embodiment of the present invention relates to an insulated synchronous rectification DC/DC converter. The DC/DC converter comprises: a transformer comprising a primary winding and a secondary winding; a switching transistor connected to the primary winding of the transformer; a synchronous rectification transistor connected to the secondary winding of the transformer; a feedback photocoupler; a shunt regulator that is connected to an input side of the feedback photocoupler, and that generates an error current that corresponds to an output voltage of the DC/DC converter; a primary-side controller that is connected to an output side of the feedback photocoupler, and that switches on and off the switching transistor according to a feedback signal received from the feedback photocoupler; and any one of the aforementioned secondary-side controllers that control the synchronous rectification transistor.

The DC/DC converter may be configured as a flyback converter or a forward converter.

Yet another embodiment of the present invention relates to a power supply apparatus (AC/DC converter). The power supply apparatus comprises: a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage, and that supplies the DC input voltage thus stepped down to a load.

Yet another embodiment of the present invention relates to an electronic device. The electronic device comprises: a load; a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage, and that supplies the DC input voltage thus stepped down to the load.

Yet another embodiment of the present invention relates to an AC adapter. The AC adapter comprises: a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage so as to generate a DC output voltage.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B"

includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

[First Embodiment]

Figure 1:
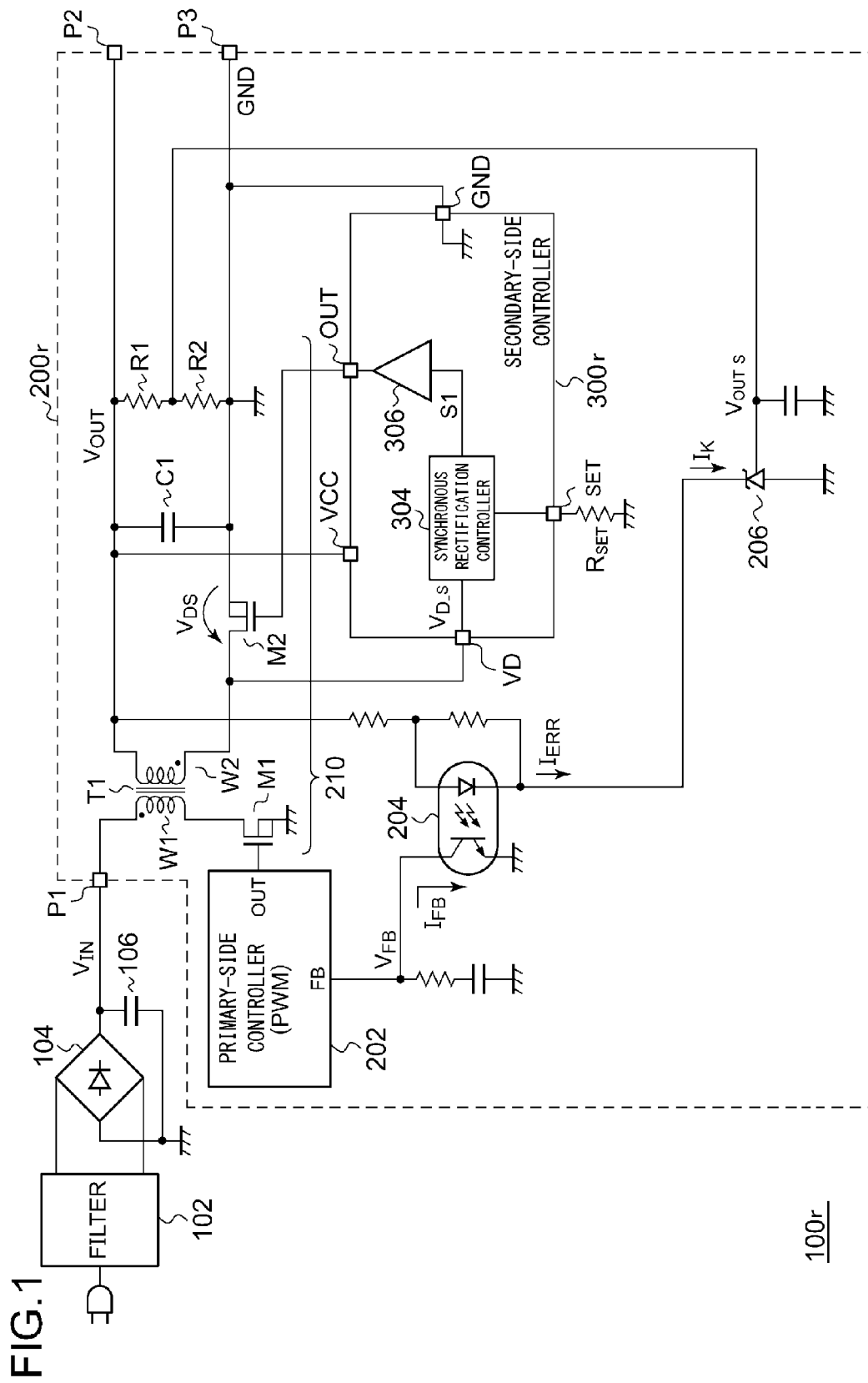
FIG. 1 is a block diagram showing a basic configuration of an AC/DC converter investigated by the present inventors.
Figure 2:
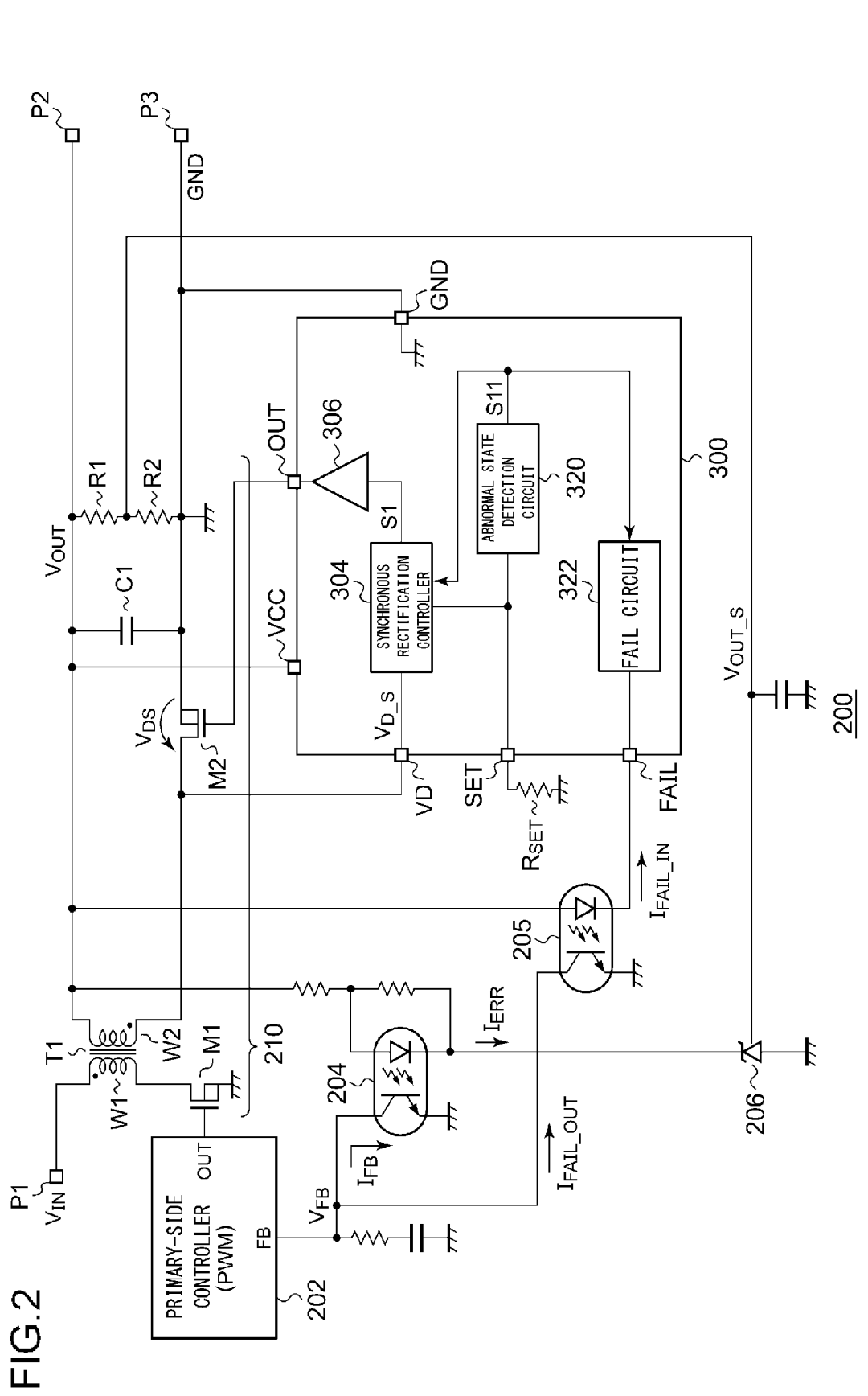
FIG. 2 is a circuit diagram showing a DC/DC converter including a secondary-side controller according to a first embodiment.

FIG. 2 is a circuit diagram showing a DC/DC converter 200 including a secondary-side controller 300 according to a first embodiment. The DC/DC converter 200 is applicable to the AC/DC converter in the same way as with the DC/DC converter 200r shown in FIG. 1. Also, the DC/DC converter 200 has the same basic configuration as that of the DC/DC converter 200r shown in FIG. 1.

The secondary-side controller 300 includes a power supply (VCC) terminal, a switching output (OUT) terminal, a drain (VD) terminal, and a ground (GND) terminal. The secondary-side controller 300 is configured as a function IC (Integrated Circuit) integrally formed on a single semiconductor substrate. The secondary-side controller 300 is housed in a single package together with the synchronous rectification transistor M2. That is to say, the secondary-side controller 300 and the synchronous rectification transistor M2 are monolithically integrated as a single module.

A DC voltage (here, the output voltage $V_{OUT}$) generated on the secondary side of the DC/DC converter 200 is supplied to the VCC terminal of the secondary-side controller 300. The secondary-side controller 300 operates using the voltage thus received via the VCC terminal as a main power supply. The VD terminal is connected to the drain of the synchronous rectification transistor M2. The OUT terminal is connected to the gate of the synchronous rectification transistor M2. The GND terminal is connected to an electric potential to be used as a reference voltage for the secondary-side controller 300. With the present embodiment, the reference electric potential on the secondary side, i.e., the ground voltage $V_{GND}$, is supplied to the GND terminal.

Furthermore, the secondary-side controller 300 includes a set (SET) terminal. In use, the SET terminal is connected to an external circuit element. In the present embodiment, this circuit element is configured as a resistor $R_{SET}$. The length of at least one time period (control time), which is to be used to drive the synchronous rectification transistor M2, is set according to the resistance value of the resistor $R_{SET}$.

The secondary-side controller 300 includes a synchronous rectification controller 304, a driver 306, an abnormal state detection circuit 320, and a fail circuit 322.

The synchronous rectification controller 304 generates a pulse signal S1 based on the state of the SET terminal, i.e., based on the control time determined according to the resistance value of the resistor $R_{SET}$. The control time may be used for (1) edge blanking, (2) a timing control operation for tuning on or turning off the synchronous rectification transistor M2, (3) a control operation for controlling the upper limit or the lower limit of the on time or the off time, or the like. With the present invention, the usage of the control time is not restricted in particular.

For example, the synchronous rectification controller 304 generates the pulse signal S1 based on the drain voltage $V_{D\_S}$ of the synchronous rectification transistor M2. The secondary-side controller 300 is arranged such that its GND terminal is connected to the common ground line together with the source of the synchronous rectification transistor M2. The secondary-side controller 300 operates with the source voltage $V_{GND}$ as its reference voltage. Thus, the drain voltage $V_{D\_S}$ at the VD terminal is the same as the voltage (drain-source voltage $V_{DS}$) across both terminals of the synchronous rectification transistor M2.

The configuration and the operation of the synchronous rectification controller 304 are not restricted in particular. Rather, the synchronous rectification controller 304 may be configured using known or prospectively available techniques. For example, when the synchronous rectification controller 304 detects that the switching transistor M1 arranged on the primary side of the DC/DC converter 200 turns off, the synchronous rectification controller 304 may set the pulse signal S1 to an on level (e.g., high level) configured as an instruction to turn on the synchronous rectification transistor M2. Furthermore, when the synchronous rectification controller 304 detects that the current $I_S$ that flows through the secondary winding W2 of the transformer T1 becomes substantially zero, the synchronous rectification controller 304 may set the pulse signal S1 to an off level (e.g., low level) configured as an instruction to turn off the synchronous rectification transistor M2. The driver 306 switches on and off the synchronous rectification transistor M2 according to the pulse signal S1.

During the on period of the switching transistor M1, the voltage across both ends of the secondary winding W2 is represented by $(-V_{IN} \times N_S/N_P)$. Accordingly, the drain voltage $V_{D\_S}$ (i.e., drain-source voltage $V_{DS}$) of the synchronous rectification transistor M2 is represented by $(V_{D\_S} = V_{OUT} + V_{IN} \times N_S/N_P)$. Here, $N_P$ and $N_S$ represent the number of turns of the primary winding W1 and the number of turns of the secondary winding W2, respectively.

When the switching transistor M1 turns off, the secondary current $I_S$ flows from the source to the drain of the synchronous rectification transistor M2. In this state, the drain-source voltage becomes a negative voltage. In the continuous mode, when the switching transistor M1 turns on, the secondary current $I_S$ becomes zero. In this stage, the drain voltage $V_D$ jumps up again to a value represented by $(V_D = V_{OUT} + V_{IN} \times N_S/N_P)$. In the discontinuous mode, when the synchronous rectification transistor M2 turns on, the energy stored in the transformer T1 decreases. In this state, the secondary current $I_S$ also decreases, which reduces the absolute value of the drain-source voltage $V_{DS}$. Eventually, the secondary current $I_S$ becomes substantially zero. In this stage, the drain-source voltage $V_{DS}$ also becomes substantially zero. In this state, ringing occurs in the drain voltage $V_{D\_S}$.

Using this mechanism, the synchronous rectification controller 304 may generate the pulse signal S1 based on the drain voltage (drain-source voltage) of the synchronous rectification transistor M2.

The driver 306 switches on and off the synchronous rectification transistor M2 according to the pulse signal S1.

The abnormal state detection circuit 320 is capable of detecting an open-circuit state and/or a short-circuit state that can occur in the SET terminal. When the abnormal state detection circuit 320 detects either the open-circuit state or the short-circuit state, the abnormal state detection circuit 320 asserts (sets to the high level, for example) a detection signal S11. When the abnormal state detection circuit 320 detects neither the open-circuit state nor the short-circuit state, the abnormal state detection circuit 320 negates (sets to the low level) the detection signal S11.

When the detection signal S11 is asserted, the secondary-side controller 300 instructs the primary-side controller 202, which is arranged on the primary side of the DC/DC converter 200, to suspend the switching operation of the switching transistor M1. Furthermore, when the detection signal S11 is asserted, the synchronous rectification controller 304 turns off the synchronous rectification transistor M2.

Specifically, the secondary-side controller 300 is provided with a fail (FAIL) terminal. In use, the FAIL terminal is connected to the input side of a fail notification photocoupler 205. When the detection signal S11 is asserted, the fail circuit 322 drives the fail notification photocoupler 205 connected to the FAIL terminal.

The primary-side controller 202 suspends the switching operation of the switching transistor M1 according to the state of the output side of the fail notification photocoupler 205. When the fail circuit 322 drives the fail notification photocoupler 205, a fail current $I_{FAIL\_IN}$ flows on the input side of the fail notification photocoupler 205, and a fail current $I_{FAIL\_OUT}$ flows on the output side thereof. The primary-side controller 202 is capable of detecting, based on the fail current $I_{FAIL\_OUT}$, an abnormal state that can occur in the SET terminal included in the secondary-side controller 300.

In the DC/DC converter 200 shown in FIG. 2, the output side of the fail notification photocoupler 205 is connected to an FB terminal of the primary-side controller 202 together with the output side of the feedback photocoupler 204.

The above is the configuration of the secondary-side controller 300 and the configuration of the DC/DC converter 200 using the secondary-side controller 300 according to the embodiment. Next, description will be made regarding the operation thereof.

[Normal Operation]

When the resistor $R_{SET}$ is connected normally to the SET terminal, the detection signal S11 is negated. In this state, the fail circuit 322 does not drive the fail notification photocoupler 205. Accordingly, the light-emitting element of the fail notification photocoupler 205 emits no light. In this state, the fail current $I_{FAIL\_OUT}$ does not flow. In this case, the feedback voltage $V_{FB}$ applied to the FB terminal of the primary-side controller 202 is adjusted by means of the shunt regulator 206 and the feedback photocoupler 204 such that the voltage detection signal $V_{OUT\_S}$ approaches the target value $V_{REF}$.

[Abnormal Operation]

When an open circuit or otherwise a short circuit occurs in the SET terminal, the detection signal S11 is asserted. In response to this, the fail circuit 322 drives the fail notification photocoupler 205. In this state, the light-emitting element of the fail notification photocoupler 205 emits light, and the fail current $I_{FAIL\_OUT}$ flows. As a result of the flow of the fail current $I_{FAIL\_OUT}$, a capacitor connected to the FB terminal is discharged. Accordingly, the feedback voltage $V_{FB}$ drops to a value in the vicinity of the ground voltage (0 V). In this state, the duty ratio of the switching transistor M1 becomes zero, which results in suspension of the switching operation of the switching transistor M1. Furthermore, in response to the assertion of the detection signal S11, the driver 306 turns off the synchronous rectification transistor M2, thereby suspending the switching operation thereof.

The above is the operation of the secondary-side controller 300. When an open circuit or otherwise a short circuit occurs in the SET terminal, the control time to be used as a reference period for the synchronous rectification controller 304 becomes excessively long or otherwise becomes excessively short. Accordingly, in this case, in some cases, the synchronous rectification transistor M2 does not turn on in a period in which it is to be turned on, or in some cases, the synchronous rectification transistor M2 turns on in a period in which it is to be turned off. For example, in the on period of the switching transistor M1, the synchronous rectification transistor M2 is to be required to be turned off. If the synchronous rectification transistor M2 turns on abnormally in this period, an overvoltage is applied across both terminals of the synchronous rectification transistor M2. In some cases, this leads to adverse effects on the reliability of the synchronous rectification transistor M2. Otherwise, if the current that flows through the secondary winding W2 suddenly changes due to abnormal turn-on or otherwise turn-off of the synchronous rectification transistor M2, an overvoltage occurs at the primary winding W1. In some cases, this leads to adverse effects on the reliability of the switching transistor M1.

The secondary-side controller 300 according to the embodiment detects an open circuit and/or a short circuit that can occur in the SET terminal (i.e., at least one from among an open circuit and a short circuit). Furthermore, upon detection of an abnormal state, the secondary-side controller 300 suspends the operation of the DC/DC converter 200. Thus, such an arrangement is capable of preventing an abnormal operation, thereby providing improved reliability.

Next, description will be made regarding a modification of the DC/DC converter 200 employing the secondary-side controller 300.

Figure 3:
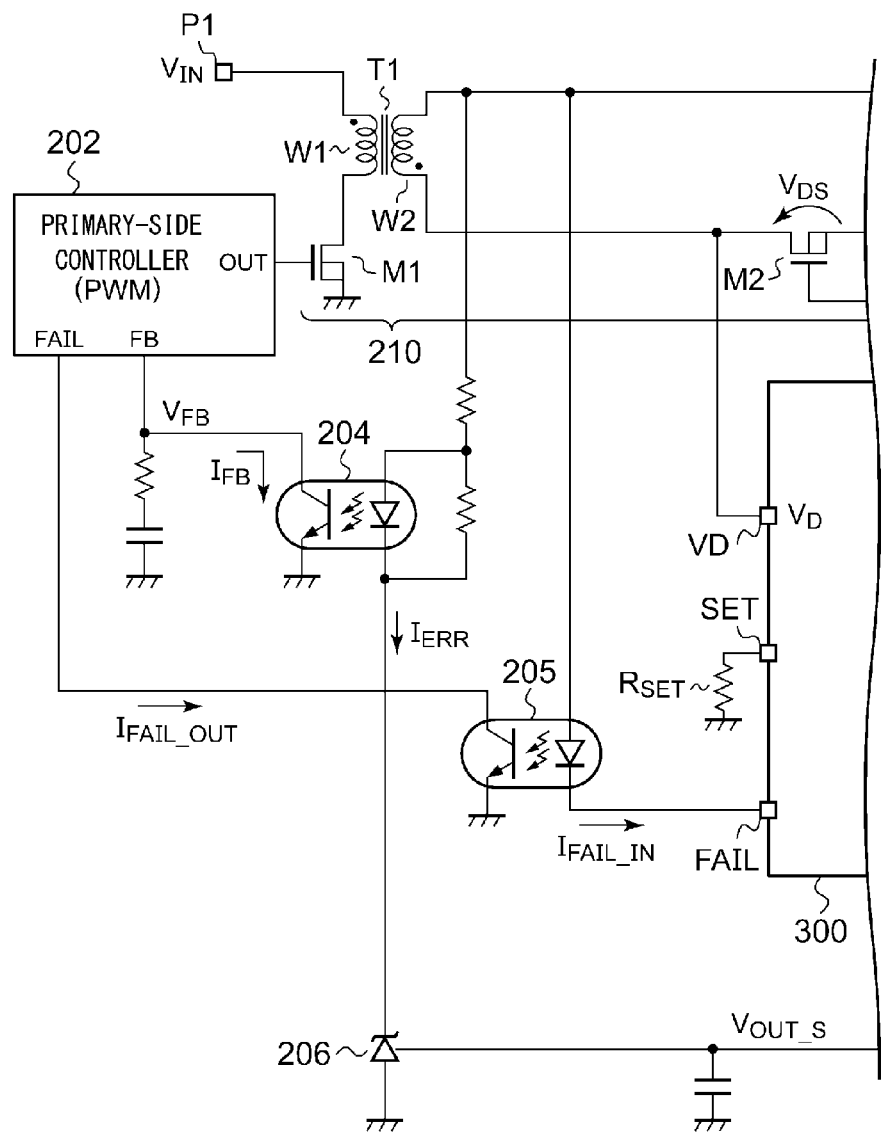
FIG. 3 is a circuit diagram showing a DC/DC converter according to a first modification.

FIG. 3 is a circuit diagram showing a DC/DC converter 200a according to a first modification. In this modification, the primary-side controller 202 includes a fail (FAIL) terminal for receiving a signal that indicates a fail notice from the secondary-side controller 300. The output side of the fail notification photocoupler 205 is connected to the FAIL terminal. The primary-side controller 202 detects the presence or absence of the fail current $I_{FAIL\_OUT}$. Upon detection of the flow of the fail current $I_{FAIL\_OUT}$, the primary-side controller 202 suspends the switching operation of the switching transistor M1.

Figure 4:
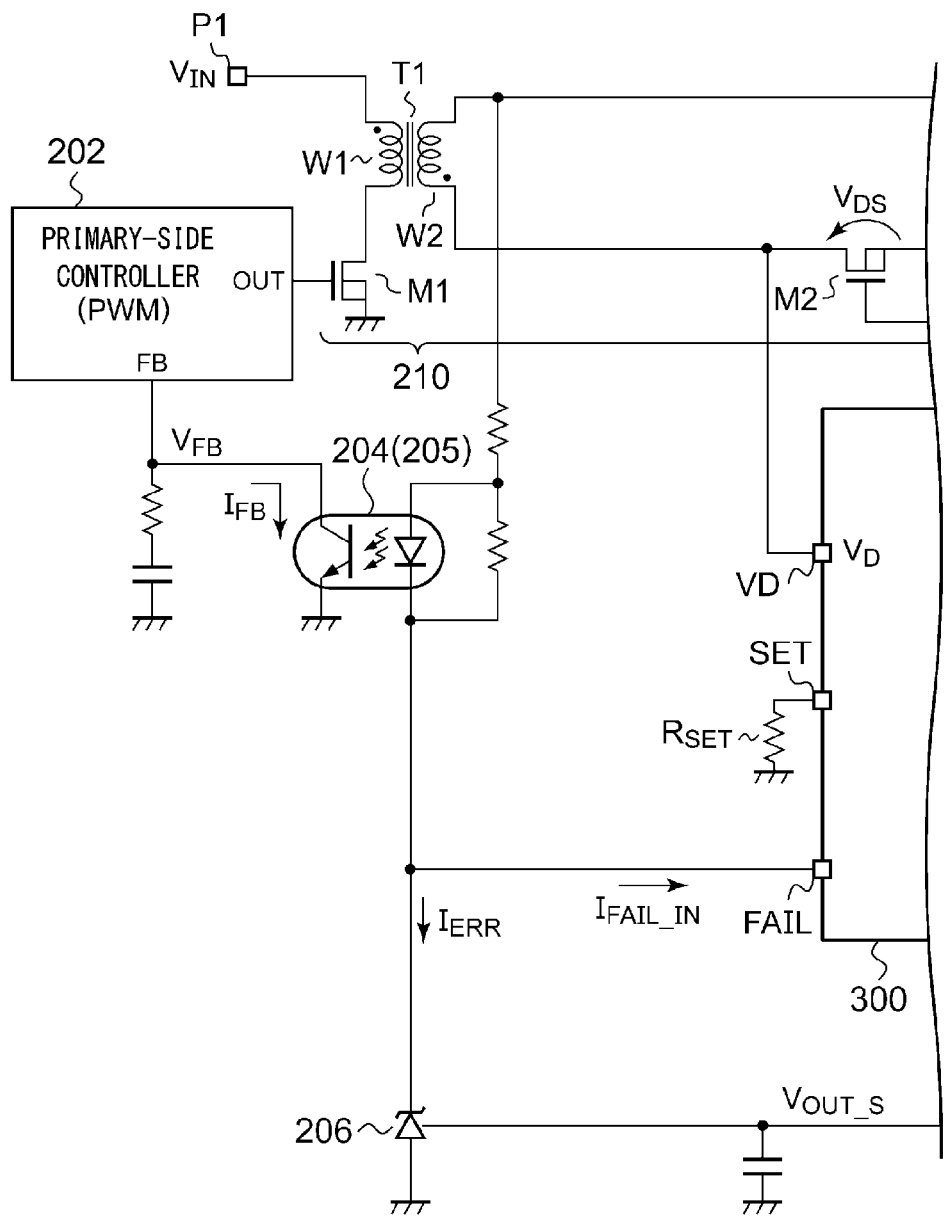
FIG. 4 is a circuit diagram showing a DC/DC converter according to a second modification.

FIG. 4 is a circuit diagram showing a DC/DC converter 200b according to a second modification. In this modification, the FAIL terminal of the secondary-side controller 300 is connected to the input side of the feedback photocoupler 204. When the detection signal S11 is asserted so as to provide a flow of the fail current $I_{FAIL\_IN}$ that is larger than the error current $I_{ERR}$, this increases the current $I_{FB}$ that flows on the output side of the feedback photocoupler 204. In this case, the capacitor connected to the FB terminal is discharged. This reduces the feedback voltage $V_{FB}$ to a value in the vicinity of the ground voltage (0 V). In this state, the duty ratio of the switching transistor M1 becomes zero, which suspends the switching operation of the switching transistor M1.

That is to say, in the second modification, the feedback photocoupler 204 also provides the same effect as that provided by the fail notification photocoupler 205.

Furthermore, the output current $I_{FB}$ of the feedback photocoupler 204 also provides the same effect as that provided by the fail current $I_{FAIL\_OUT}$.

[Second Embodiment]

Figure 5:
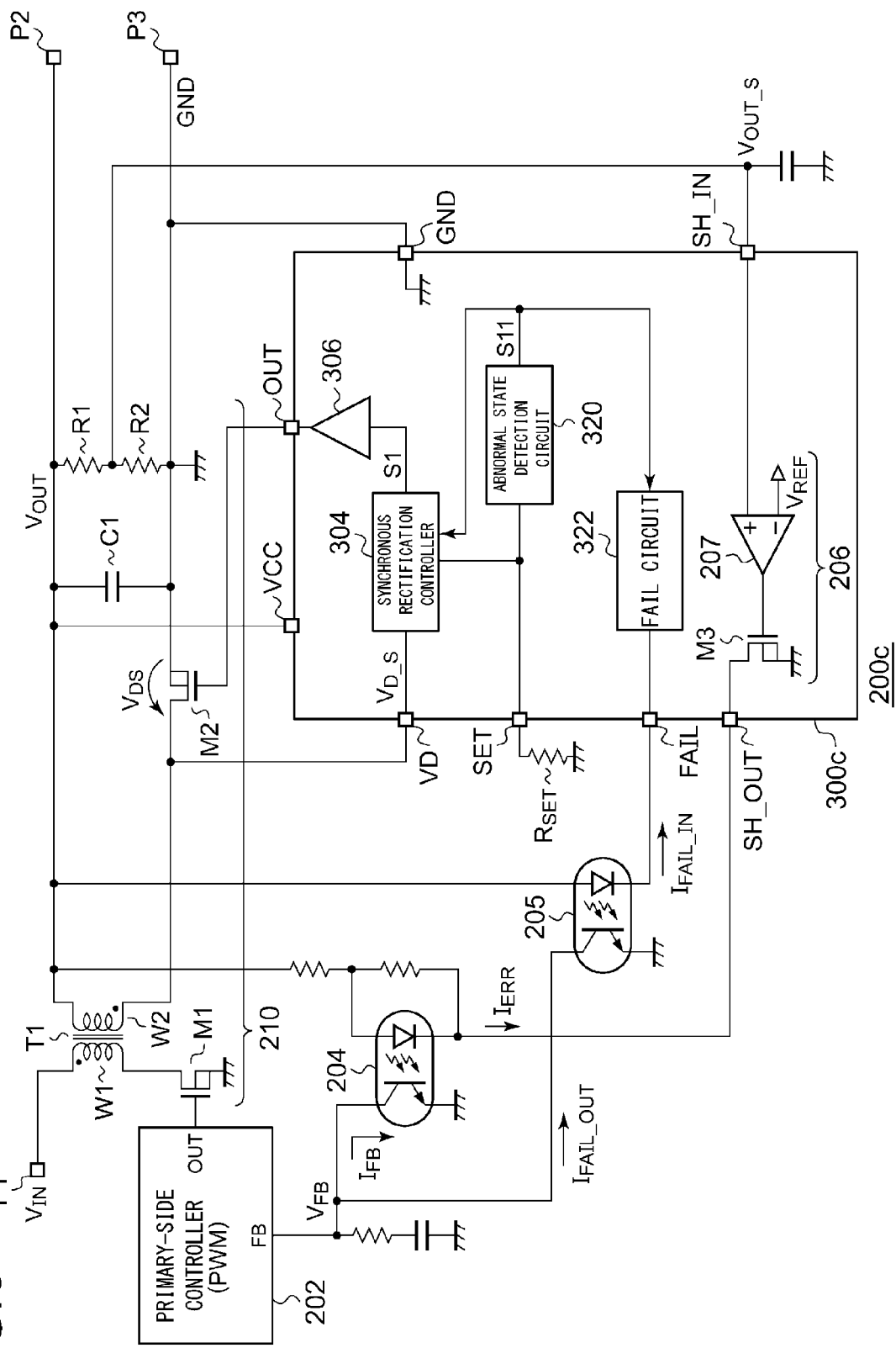
FIG. 5 is a circuit diagram showing a DC/DC converter including a secondary-side controller according to a second embodiment.

FIG. 5 is a DC/DC converter 200c including a secondary-side controller 300c according to a second embodiment. The secondary-side controller 300c has the same configuration as that of the secondary-side controller 300 shown in FIG. 2 except that a shunt regulator 206 is built into the secondary-side controller 300c. The shunt regulator 206 includes a transistor M3 and an error amplifier 207. The voltage detection signal $V_{OUT\_S}$ is input to the input terminal (SH_IN) of the shunt regulator 206. The error amplifier 207 amplifies the difference between the voltage detection signal $V_{OUT\_S}$ and the reference voltage $V_{REF}$. The transistor M3 is connected to the output terminal (SH_OUT) of the shunt regulator 206. The output $V_{ERR}$ of the error amplifier 207 is input to the gate of the transistor M3. In a case in which the transistor M3 is configured as a P-channel MOSFET or otherwise a PNP bipolar transistor, the error amplifier 207 may preferably be arranged such that its inverting input terminal and its non-inverting input terminal are mutually exchanged.

With the secondary-side controller 300c, such an arrangement also provides the same effects as those provided by the first embodiment. Also, the secondary-side controller 300c may be applied to the DC/DC converter 200a shown in FIG. 3 and the DC/DC converter 200b shown in FIG. 4.

[Third Embodiment]

Figure 6:
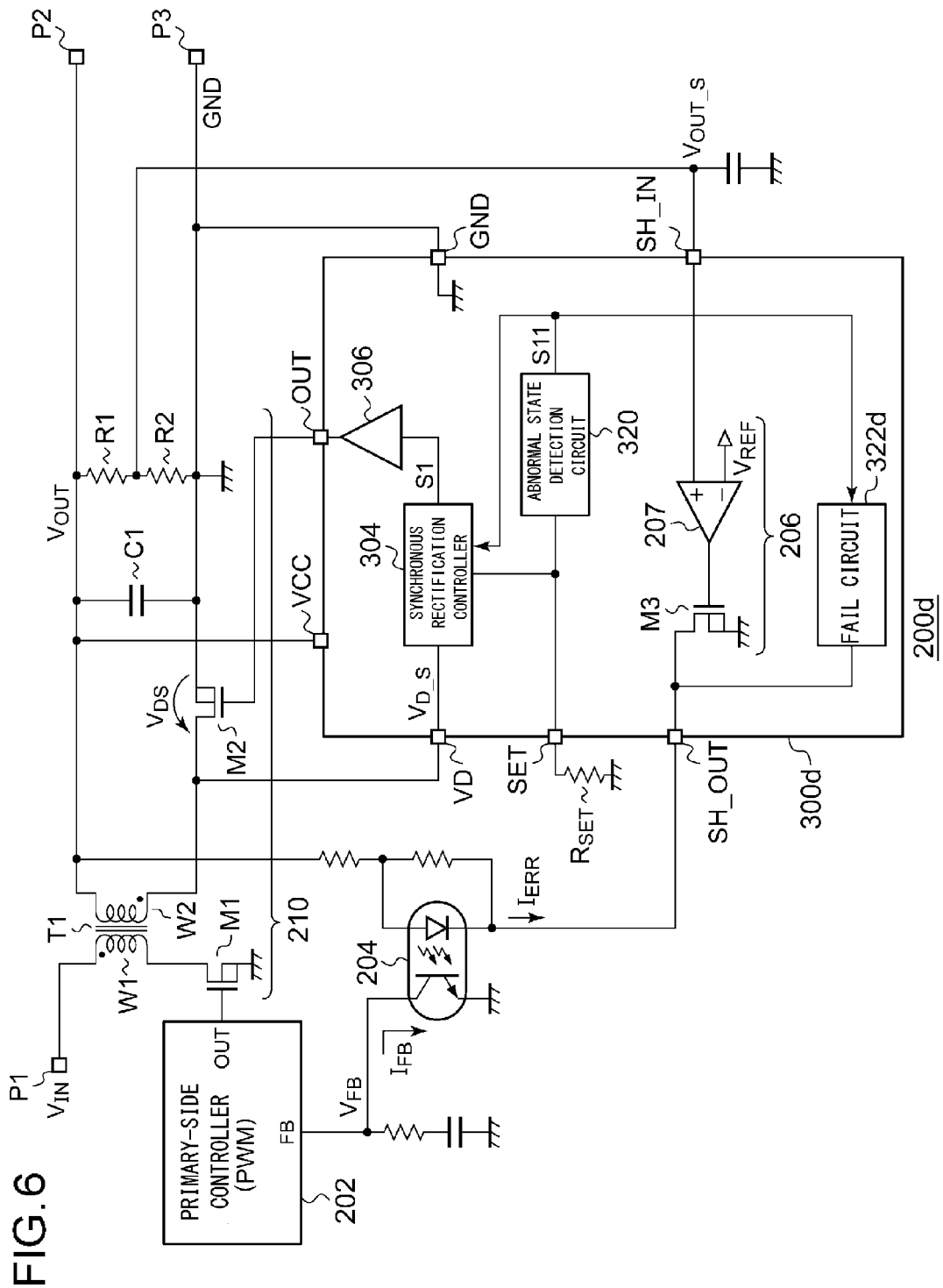
FIG. 6 is a circuit diagram showing a DC/DC converter including a secondary-side controller according to a third embodiment.

FIG. 6 is a circuit diagram showing a DC/DC converter 200d including a secondary-side controller 300d according to a third embodiment. A shunt regulator 206 is built into the secondary-side controller 300d, as with a configuration shown in FIG. 5. When the detection signal S11 is asserted, a fail circuit 322d drives the feedback photocoupler 204 connected to the SH_OUT terminal.

For the secondary-side controller 300d, it can be understood that the SH_OUT terminal also provides the same effect as that provided by the FAIL terminal, and that the feedback photocoupler 204 provides the same effect as that provided by the fail notification photocoupler 205.

Next, description will be made regarding a specific example configuration of the secondary-side controller 300. It should be noted that the present invention encompasses various arrangements derived based on the first through third embodiments. That is to say, the present invention is not restricted to such a specific configuration described below.

Figure 7:
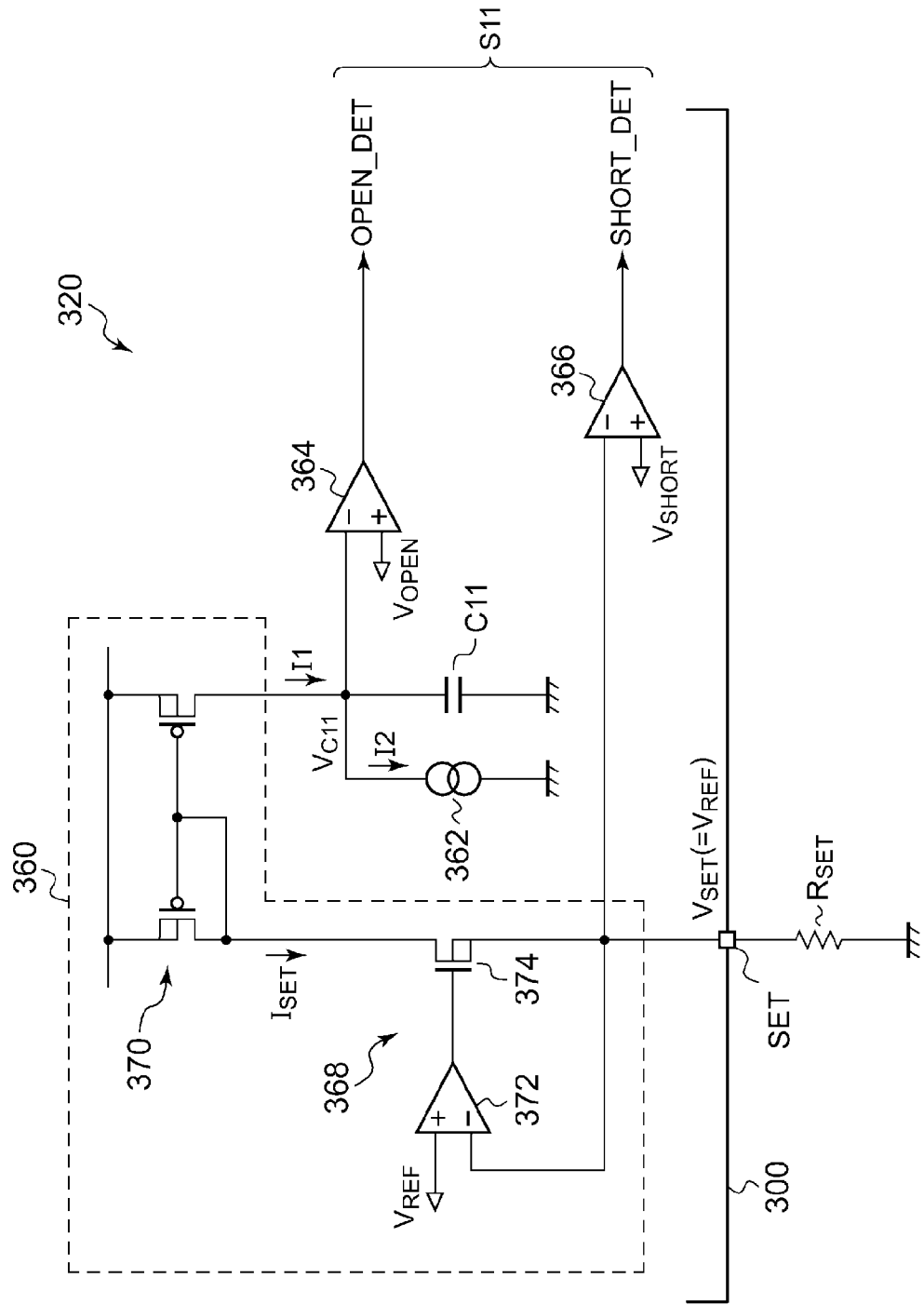
FIG. 7 is a circuit diagram showing an example configuration of an abnormal state detection circuit.

FIG. 7 is a circuit diagram showing an example configuration of the abnormal state detection circuit 320.

In use, the SET terminal is connected to the resistor $R_{SET}$ configured as an external component. The abnormal state detection circuit 320 includes a first capacitor C11, a charger circuit 360, a discharger circuit 362, and an open circuit detection comparator 364. The charger circuit 360 charges the first capacitor C11 using a first current I1 that is inversely proportional to the resistance value of the resistor $R_{SET}$.

The charger circuit 360 may include a constant current circuit (V/I converter circuit) 368 and a current mirror circuit 370. The constant current circuit 368 includes an error amplifier 372 and a transistor 374. The constant current circuit 368 applies a reference voltage $V_{REF}$ to the SET terminal. A current $I_{SET}$, which is represented by $I_{SET}=V_{REF}/R_{SET}$, flows through the transistor 374 and the resistor $R_{SET}$. The current mirror circuit 370 mirrors the current $I_{SET}$ so as to output the first current I1.

The discharger circuit 362 discharges the first capacitor C11 with a predetermined second current I2. The open circuit detection comparator 364 compares the voltage $V_{C11}$ across the first capacitor C11 with a threshold voltage $V_{OPEN}$ set for detecting an open circuit. The output of the open circuit detection comparator 364 is used as a detection signal OPEN_DET which indicates an open-circuit fault.

Furthermore, the abnormal state detection circuit 320 includes a short circuit detection comparator 366. The charger circuit 360 compares the voltage $V_{SET}$ at the SET terminal with a threshold voltage $V_{SHORT}$ for detecting a short circuit. The output of the short circuit detection comparator 366 is used as a detection signal SHORT_DET which indicates a short-circuit fault.

Next, description will be made regarding the operation of the abnormal state detection circuit 320.

[Open Circuit Detection]

When an open circuit occurs in the SET terminal, the current $I_{SET}$ and the first current I1 become zero. Accordingly, the first capacitor C11 is discharged with the second current I2. This reduces the voltage $V_{C11}$ across the first capacitor C11. When the voltage $V_{C11}$ becomes lower than a threshold voltage $V_{OPEN}$, the output OPEN_DET of the open circuit detection comparator 364 is asserted (set to the high level).

[Short Circuit Detection]

In the normal operation, the voltage $V_{SET}$ at the SET terminal is equal to the reference voltage $V_{REF}$. However, when the SET terminal is short-circuited to the ground, the voltage $V_{SET}$ at the SET terminal drops to a value in the vicinity of 0 V. Accordingly, by setting the threshold voltage $V_{SHORT}$ to a value (e.g., 0.2 V) in the vicinity of the ground voltage, such an arrangement is capable of detecting a state in which the SET terminal is short-circuited to the ground. On the other hand, when the SET terminal is short-circuited to the power supply, the voltage $V_{SET}$ at the SET terminal rises up to a value in the vicinity of the power supply voltage. Thus, by setting the threshold voltage $V_{SHORT}$ to a value in the vicinity of the power supply voltage, such an arrangement is capable of detecting a state in which the SET terminal is short-circuited to the power supply. It should be noted that the configuration of the abnormal state detection circuit 320 is not restricted to such an arrangement shown in FIG. 7. Also, the abnormal state detection circuit 320 may be configured using known techniques.

Figure 8:
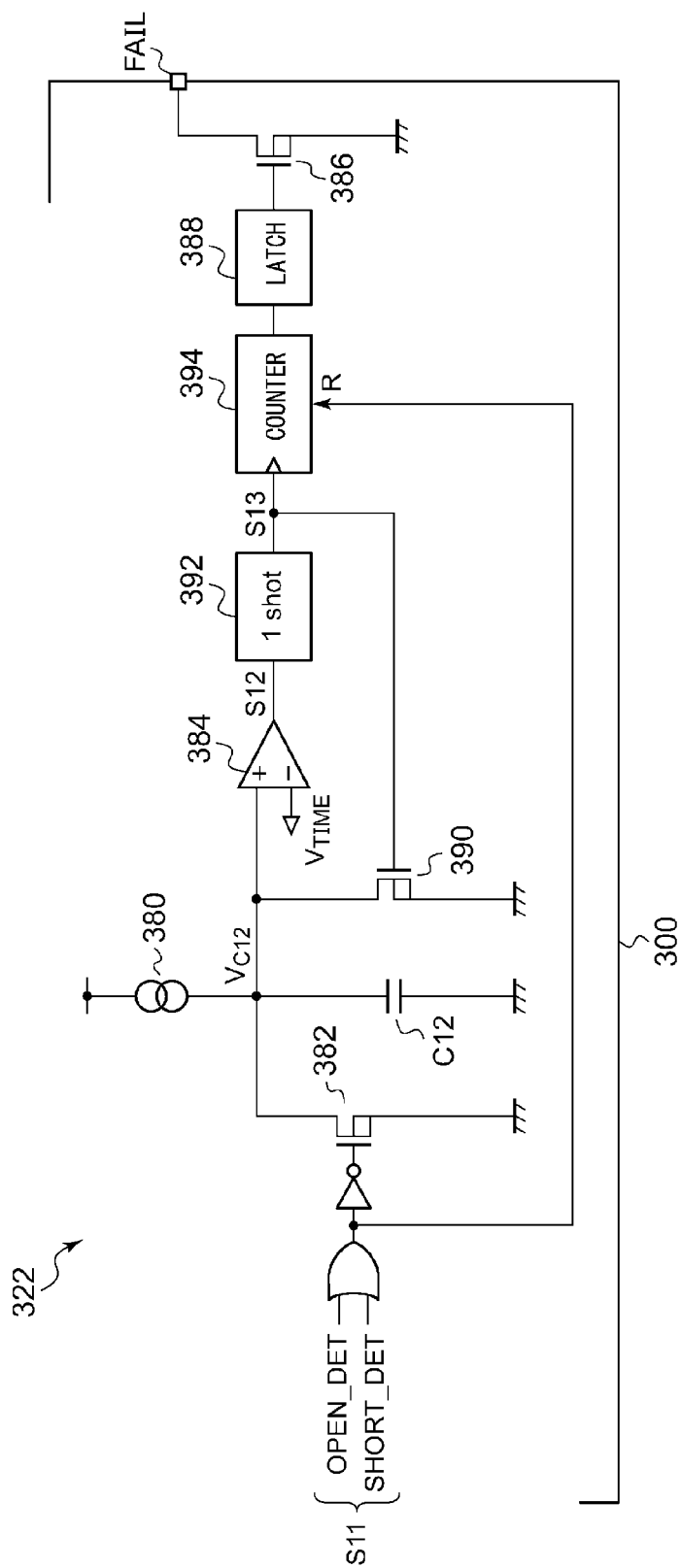
FIG. 8 is a circuit diagram showing an example configuration of a fail circuit.

FIG. 8 is a circuit diagram showing an example configuration of the fail circuit 322. When the assertion of the detection signal S11 (i.e., OPEN_DET or otherwise SHORT_DET) continues for a predetermined time period, the fail circuit 322 drives a photocoupler to be driven (feedback photocoupler 204 or otherwise the fail notification photocoupler 205). Such an arrangement is capable of masking an assertion of the detection signal S11 when it occurs for only a very short period of time. Thus, such an arrangement is capable of preventing false detection of the short-circuit state and the open-circuit state.

The fail circuit 322 mainly includes a second capacitor C12, a current source 380, a discharger transistor 382, and a comparator 384. The current source 380 charges the second capacitor C12. The discharger transistor 382 is arranged in parallel with the second capacitor C12. When the detection signal S11 is negated (set to the low level), the discharger transistor 382 is turned on. When the voltage $V_{C12}$ across the second capacitor C12 exceeds the threshold voltage $V_{TIME}$, the comparator 384 asserts the fail signal S12.

The fail circuit 322 drives the photocoupler 205 (204) to be driven in response to the assertion of the fail signal S12. Specifically, the fail circuit 322 may be connected to the FAIL terminal (SH_OUT terminal). Also, the fail circuit 322 may include a driving transistor 386 that turns on in response to the assertion of the fail signal S12. A flip-flop 388 latches the assertion of the fail signal S12. In this state, the flip-flop 388 fixes the driving transistor 386 to the on state.

When the fail signal S12 is consecutively asserted a predetermined number of times, the fail circuit 322 may drive the photocoupler 205 (204). In order to provide such an operation, the fail circuit 322 further includes a discharger transistor 390, a one-shot circuit 392, and a counter 394.

The discharger transistor 390 is arranged in parallel with the second capacitor C12. The one-shot circuit 392 generates a signal S13 which is set to the high level for a predetermined time period from the time point at which an edge occurs in the fail signal S12. During a period in which the signal S13 is set to the high level, the discharger transistor 390 is turned on, which resets the voltage across the capacitor C12. The counter 394 counts the number of times the output S13 of the one-shot circuit 392 becomes the high level. When the count value reaches the predetermined number, the counter 394 latches the driving transistor 386 in the on state. When the detection signal S11 is negated, the count value of the counter 394 is reset. The above is an example configuration of the fail circuit 322. It should be noted that the configuration of the fail circuit 322 is not restricted to such an arrangement shown in FIG. 8.

Figure 9:
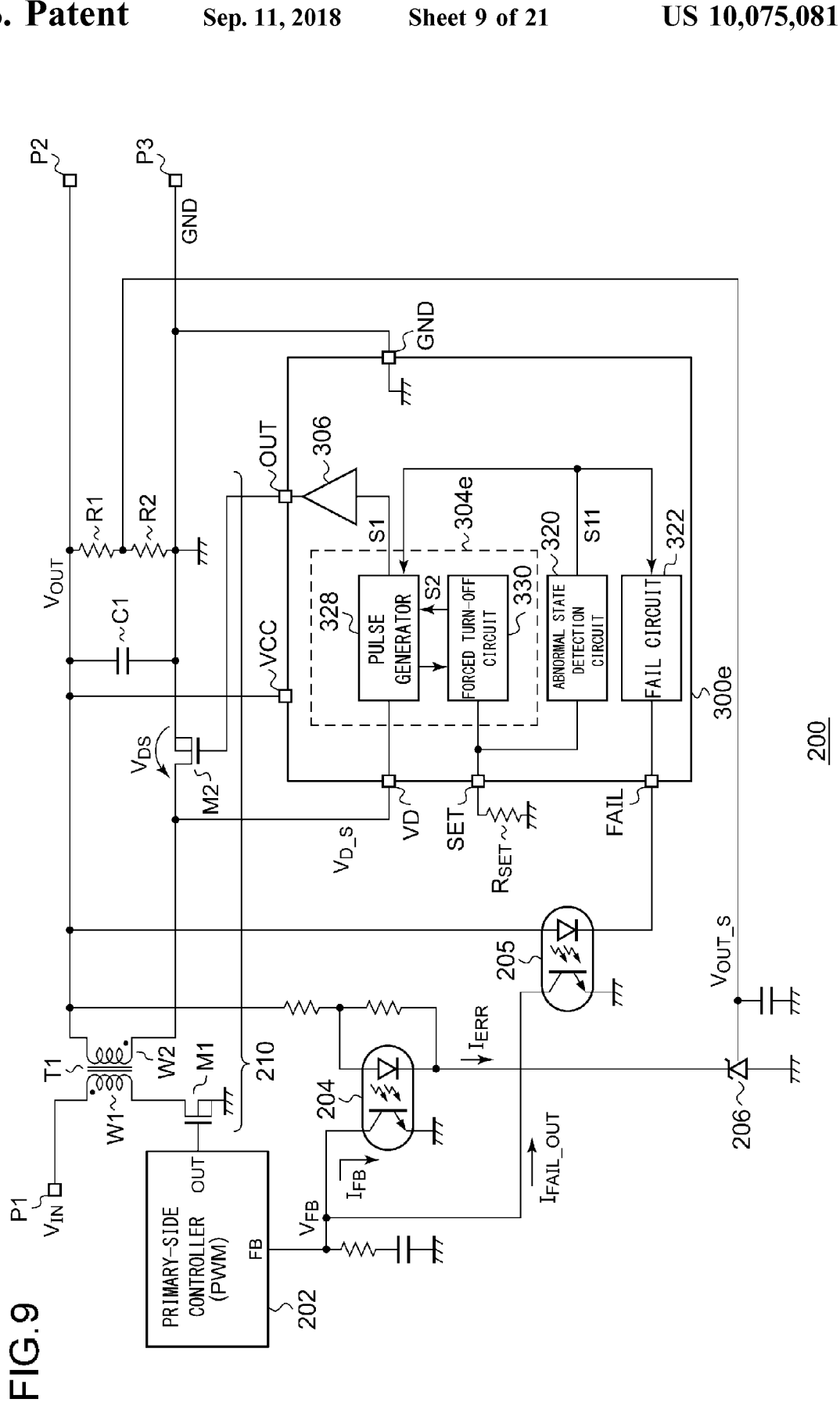
FIG. 9 is a circuit diagram showing an example configuration of a secondary-side controller.

Next, description will be made regarding an example configuration of the synchronous rectification controller 304. FIG. 9 is a circuit diagram showing an example configuration of a secondary-side controller 300e. A synchronous rectification controller 304e has the same configuration as that shown in FIG. 2 except that the synchronous rectification controller 304e includes a pulse generator 328 and a forced turn-off circuit 330. The synchronous rectification controller 304e is applicable to the secondary-side controller 300c shown in FIG. 5 and the secondary-side controller 300d shown in FIG. 6.

The pulse generator 328 generates the pulse signal S1 based on the voltage $V_{DS}$ across both terminals of the synchronous rectification transistor M2. Upon detection of the turn-off of the switching transistor M1, the pulse generator 328 sets the pulse signal S1 to the on level which instructs the synchronous rectification transistor M2 to turn on. Upon detecting that the current $I_S$ that flows through the secondary winding W2 has become substantially zero, the pulse generator 328 sets the pulse signal S1 to the off level which instructs the synchronous rectification transistor M2 to turn off.

When the synchronous rectification transistor M2 turns on after a predetermined time-up period $T_{UP}$ elapses after detection of the turn-on of the switching transistor M1 (which will be referred to as "forced turn-off timing"), the forced turn-off circuit 330 forcibly turns off the synchronous rectification transistor M2. In the present embodiment, the forced turn-off circuit 330 asserts a forced turn-off signal S2 at the forced turn-off timing. With such an arrangement, the pulse signal S1 is switched to the off level (low level) using the forced turn-off signal S2.

The time-up period $T_{UP}$ is set to be shorter than the switching period $T_{SW}$ set for the switching transistor M1. In a case in which the switching frequency $f_{SW}$ is changed according to the load, the time-up period $T_{UP}$ may preferably be set to be shorter than the period represented by $T_{SWMAX}$ (=$1/f_{MAX}$) that corresponds to the maximum frequency $f_{MAX}$.

It should be noted that the method for forcibly turning off the synchronous rectification transistor M2 is not restricted in particular. As another embodiment, for example, a logic gate may be arranged as an additional component between the synchronous rectification controller 304e and the driver 306 so as to mask the pulse signal S1. Also, a low-side transistor (not shown) of a push-pull output stage of the driver 306 may be forcibly turned on.

The aforementioned control time corresponds to the time-up period $T_{UP}$. The SET terminal is used to set the length of the time-up period $T_{UP}$.

The above is the configuration of the secondary-side controller 300e shown in FIG. 9. Before description of the operation of the secondary-side controller 300 shown in FIG. 9, description will be made regarding problems that can occur in a case in which such a forced turn-off circuit 330 is not provided.

The present inventors have come to recognize the following problems that occur in the DC/DC converter 200r including no forced turn-off circuit 330 as shown in FIG. 1 when it operates in the continuous mode.

Figure 10:
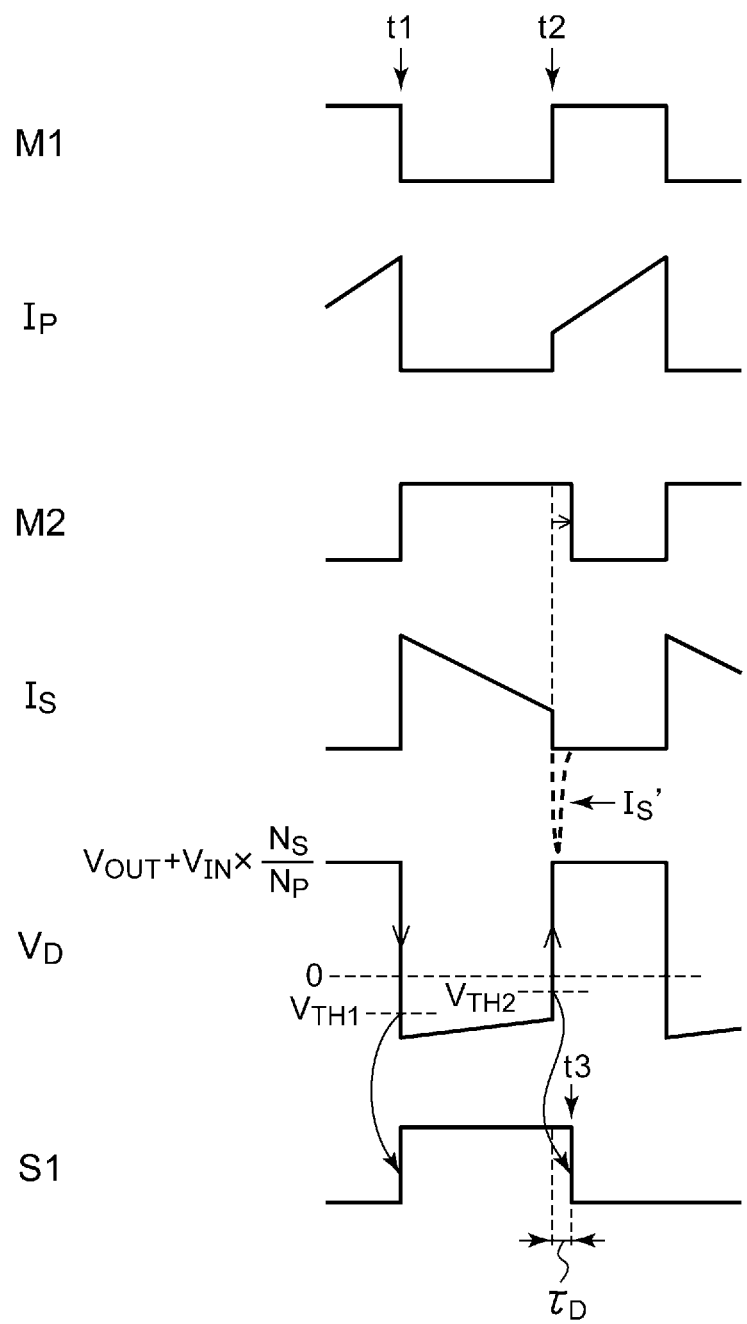
FIG. 10 is an operation waveform diagram showing the operation of a DC/DC converter including no forced turn-off circuit in the continuous mode.

FIG. 10 is an operation waveform diagram showing the operation of the DC/DC converter 200r including no forced turn-off circuit 330 when it operates in the continuous mode. Before the time point t1, the switching transistor M1 turns on. In this state, the drain voltage $V_D$ of the synchronous rectification transistor M2 is represented by ($V_{OUT}+V_{IN}\times N_S/N_P$). When the transistor M1 is turned off at the time point t1, the secondary current $I_S$ starts to flow through the secondary winding W2. In this state, the drain voltage $V_D$ becomes a negative voltage. When the synchronous rectification controller 304 detects that the drain voltage $V_D$ crosses a first threshold voltage $V_{TH1}$ when it drops from the upper side to the lower side, the synchronous rectification controller 304 sets the pulse signal S1 to a first state. As a result, the synchronous rectification transistor M2 is turned on.

In the on period of the synchronous rectification transistor M2, the absolute value of the drain voltage $V_D$ decreases according to a reduction in the secondary current $I_S$. When the switching transistor M1 turns on at a time point t2, the secondary current $I_S$ becomes zero. In this state, the drain voltage $V_D$ jumps up again to a value represented by ($V_{OUT}+V_{IN}\times N_S/N_P$). When the drain voltage $V_D$ crosses a second threshold voltage $V_{TH2}$ when it rises from the lower side to the upper side, the synchronous rectification controller 304 sets the pulse signal S1 to a second state. As a result, the synchronous rectification transistor M2 is turned off.

With such an arrangement, there is a delay time period $\tau_D$ from the time point t2 at which the drain voltage $V_D$ crosses the threshold voltage $V_{TH2}$ up to a time point t3 at which the synchronous rectification transistor M2 turns off according to a transition of the pulse signal S1 to the second state. During the delay time $\tau_D$, the synchronous rectification transistor M2 turns on. In this state, a large voltage $V_D$ occurs across both terminals of the synchronous rectification transistor M2 in a state in which it has an extremely low impedance. Accordingly, in some cases, this leads to a problem of a large amount of current flowing through the synchronous rectification transistor M2 (as indicated by the broken line $I_S'$).

During the delay time $\tau_D$, the large current $I_S'$ flows through the synchronous rectification transistor M2 via the secondary winding W2. When the synchronous rectification transistor M2 turns off at the time point t3, the current $I_S'$ that flows through the secondary winding W2 is cut off. This generates a high voltage across both ends of the secondary winding W2 as represented by $Vx=dI_S'/dt$. The high voltage Vx induces the voltage Vy across both ends of the primary winding W1 as represented by $Vy=-Vx\times N_P/N_S$. In a case in which the voltage Vy thus induced is applied to the switching transistor M1, in some cases, this leads to degradation of the reliability of the switching transistor M1.

In order to solve such problems, an approach is conceivable in which the primary-side controller 202 supplies, to the secondary-side controller 300, a timing signal which indicates the turn-on of the switching transistor M1. With such an arrangement, the secondary-side controller 300 turns off the synchronous rectification transistor M2 before the turn-on of the switching transistor M1.

However, with such an insulated converter, there is a need to provide electrical insulation between the primary side and the secondary side. Such an arrangement requires an additional photocoupler or a capacitor, leading to a problem of an increased circuit cost.

The above are problems that can occur in the continuous mode. Next, description will be made regarding an operation of the secondary-side controller 300 shown in FIG. 9 for solving such problems.

Figure 11:
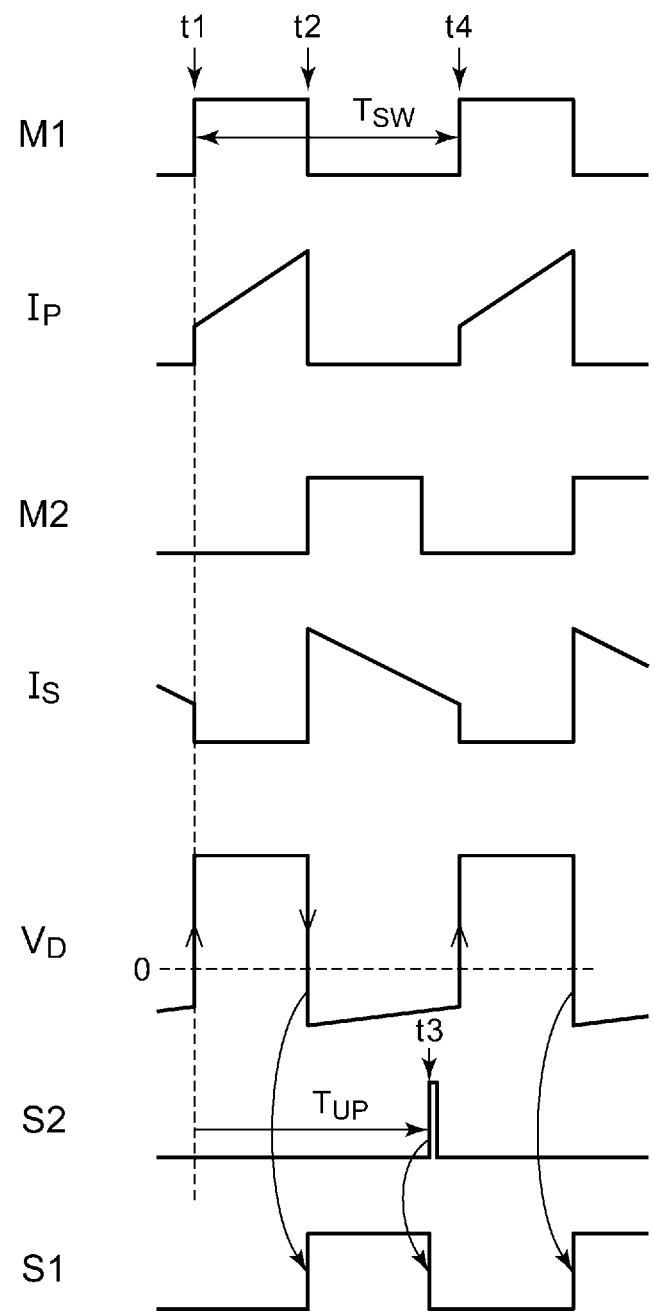
FIG. 11 is an operation waveform diagram showing the operation of the DC/DC converter shown in FIG. 9 in the continuous mode.

FIG. 11 is an operation waveform diagram showing the operation of the DC/DC converter 200 shown in FIG. 9 when it operates in the continuous mode. At the time point t1, the switching transistor M1 is turned on. When the switching transistor M1 turns on, the forced turn-off circuit 330 starts time measurement. When the time-up period $T_{UP}$ elapses, the forced turn-off signal S2 is asserted. With such an arrangement, the time-up period $T_{UP}$ is determined so as to satisfy the relation $T_{UP}<T_{SW}$. Thus, the pulse signal S1 is switched to the off level before the time point t4 at which the switching transistor M1 turns on in the next cycle. That is to say, such an arrangement is capable of turning off the synchronous rectification transistor M2 before the time point t4 at which the switching transistor M1 turns on in the next cycle.

Figure 12:
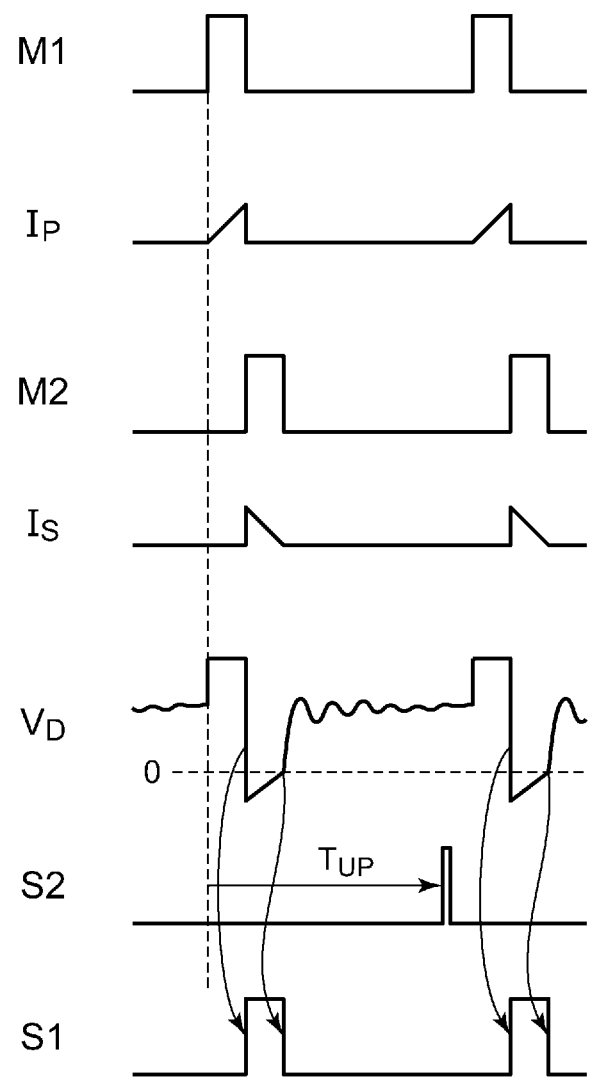
FIG. 12 is an operation waveform diagram showing the operation of the DC/DC converter shown in FIG. 9 in the discontinuous mode.

FIG. 12 is an operation waveform diagram showing the operation of the DC/DC converter 200 shown in FIG. 9 when it operates in the discontinuous mode. In the discontinuous mode, the secondary current $I_S$ becomes substantially zero before the assertion of the forced turn-off signal S2. Accordingly, the synchronous rectification transistor M2 switches on and off without involving forced turning-off according to the forced turn-off signal S2.

The above is the operation of the DC/DC converter 200.

With the DC/DC converter 200, as shown in FIG. 11, in the continuous mode, the synchronous rectification transistor M2 turns off before the switching transistor M1 turns on. Thus, such an arrangement is capable of solving a problem that can occur in the continuous mode. Such an arrangement configured to provide such a control operation does not require the primary-side controller 202 to supply, to the secondary-side controller 300, a timing signal that indicates the turn-on of the switching transistor M1. Thus, such an arrangement requires no additional component such as a photocoupler or a capacitor used to transmit a timing signal, thereby providing an advantage from the cost viewpoint.

With the secondary-side controller 300e, if an open circuit occurs in the SET terminal, the time-up period $T_{UP}$ becomes excessively long, leading to a problem in that the configuration of the secondary-side controller 300e becomes equivalent to that of having no forced turn-off circuit 330. Thus, in this case, such an arrangement involves the aforementioned problems that can occur in the continuous mode. Conversely, if the SET terminal is short-circuited to the ground, the time-up period becomes excessively short. This leads to a reduced on time of the synchronous rectification transistor M2, which becomes a cause of abnormal generation of heat.

With the secondary-side controller 300e shown in FIG. 9, by detecting an open-circuit fault and a short-circuit fault that can occur in the SET terminal, such an arrangement provides improved reliability.

Figure 13:
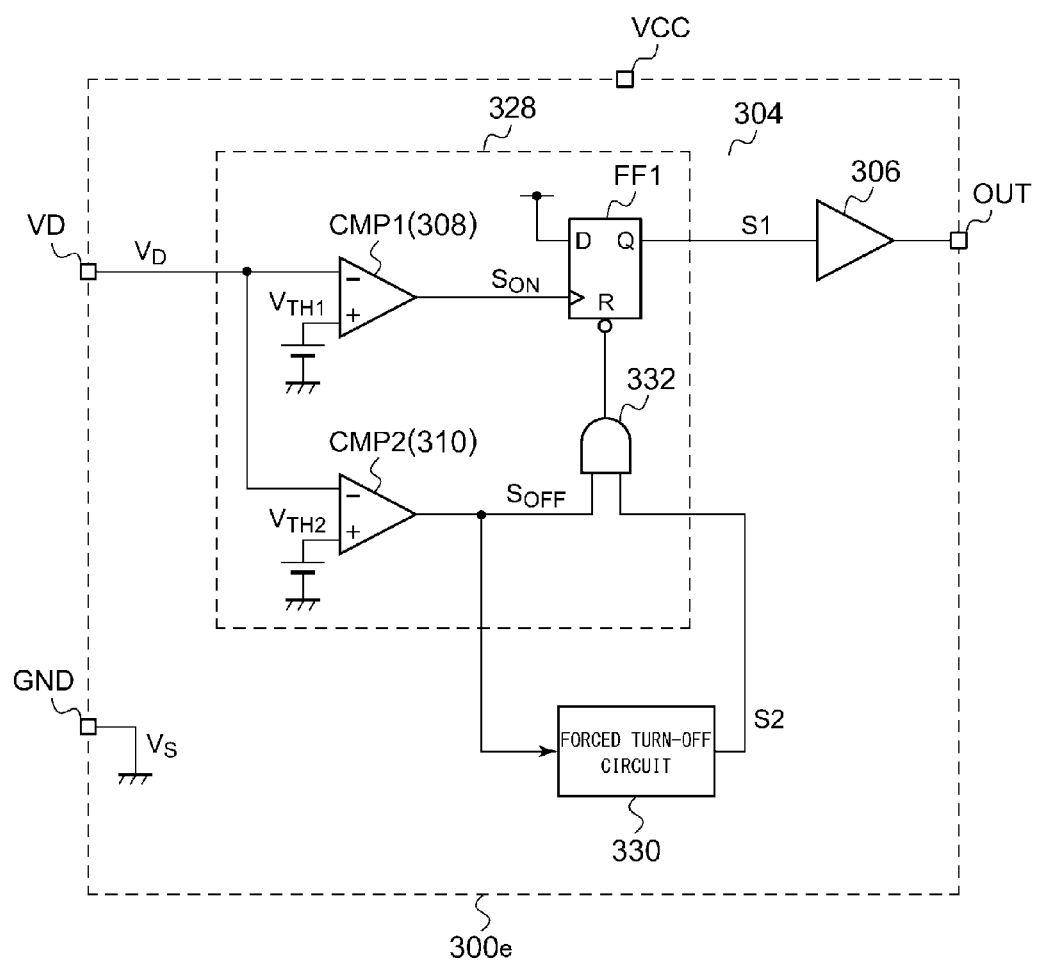
FIG. 13 is a circuit diagram showing a secondary-side controller according to a first example configuration.

FIG. 13 is a circuit diagram showing a secondary-side controller 300e according to a first example configuration.

The pulse generator 328 includes a set signal generating unit 308, a reset signal generating unit 310, and a D flip-flop FF1. The secondary-side controller 300e is arranged such that its GND terminal is connected to the source of the synchronous rectification transistor M2. Accordingly, with the secondary-side controller 300e, the voltage $V_D$ at the VD terminal corresponds to the drain-source voltage of the synchronous rectification transistor M2.

As described above, (i) when the switching transistor M1 turns off, the pulse generator 328 sets the pulse signal S1 to a first state (high level). (ii) When the current $I_S$ that flows through the secondary winding W2 becomes substantially zero in the on period of the synchronous rectification transistor M2, the pulse generator 328 sets the pulse signal S1 to a second state (low level).

The set signal generating unit 308 includes a first comparator CMP1 in order to detect (i) whether or not the switching transistor M1 turns off. The first comparator CMP1 compares the drain voltage (drain-source voltage) $V_D$ at the VD terminal with a predetermined negative first threshold voltage $V_{TH1}$ (e.g., −150 mV). When the drain voltage $V_D$ crosses the first threshold voltage $V_{TH1}$, the first comparator CMP1 asserts (sets to the high level) a set signal $S_{ON}$. Specifically, when the drain voltage $V_D$ becomes lower than the threshold voltage $V_{TH1}$, i.e., when the drain-source voltage $V_{DS}$ becomes a negative voltage, the set signal $S_{ON}$ is set to the high level. The set signal $S_{ON}$ is input to a clock terminal of the D flip-flop FF1. The pulse signal S1 is switched to the high level in response to a positive edge that occurs in the set signal $S_{ON}$. Instead of the D flip-flop FF1, an RS flip-flop may be employed.

The reset signal generating unit 310 includes a second comparator CMP2 in order to detect (ii) whether or not the secondary current $I_S$ that flows through the secondary winding W2 becomes substantially zero in the on period of the synchronous rectification transistor M2. In the off period of the switching transistor M1, the current $I_S$ flows from the source to the drain of the synchronous rectification transistor M2. Thus, the drain-source voltage $V_{DS}$ becomes a negative voltage having an absolute value that corresponds to the current value of the current $I_S$. Using this mechanism, the second comparator CMP2 compares the drain voltage $V_D$ with a negative threshold voltage $V_{TH2}$ (e.g., −10 mV) set to a negative value in the vicinity of zero. When the drain voltage $V_D$ becomes higher than the threshold voltage $V_{TH2}$, the second comparator CMP2 asserts (set to the low level) a reset signal $S_{OFF}$. The reset signal $S_{OFF}$ is input to a reset terminal (logical inversion) of the flip-flop FF1. The pulse signal S1 is switched to the low level in response to a negative edge of the reset signal $S_{OFF}$.

When at least one from among the reset signal $S_{ON}$ and the forced turn-off signal S2 is asserted (set to the low level), the flip-flop FF1 switches the pulse signal S1 to the off level (low level). In order to provide such an operation, a logic circuit 332 is provided. The logic circuit 332 performs a logical operation on the forced turn-off signal S2 and the reset signal $S_{OFF}$, and outputs the logical value thus obtained to a reset terminal (logical inversion) of the flip-flop FF1. With such an arrangement, the logic circuit 332 is configured as an AND gate. Also, the configuration thereof may be modified as appropriate according to the logical values of the corresponding signals.

As shown in FIG. 11, in the continuous mode, the secondary current $I_S$ becomes zero according to the turn-on of the switching transistor M1. In this stage, the drain voltage $V_D$ jumps up. Thus, the timing at which the second comparator CMP2 detects that the current becomes zero substantially matches the timing at which the switching transistor M1 turns on. Using this mechanism, when the reset signal $S_{OFF}$ is asserted, the forced turn-off circuit 330 starts time measurement on the assumption that the switching transistor M1 turns on when the reset signal $S_{OFF}$ is asserted.

The secondary-side controller 300e shown in FIG. 13 is capable of solving various kinds of problems that can occur in the continuous mode.

Figure 14:
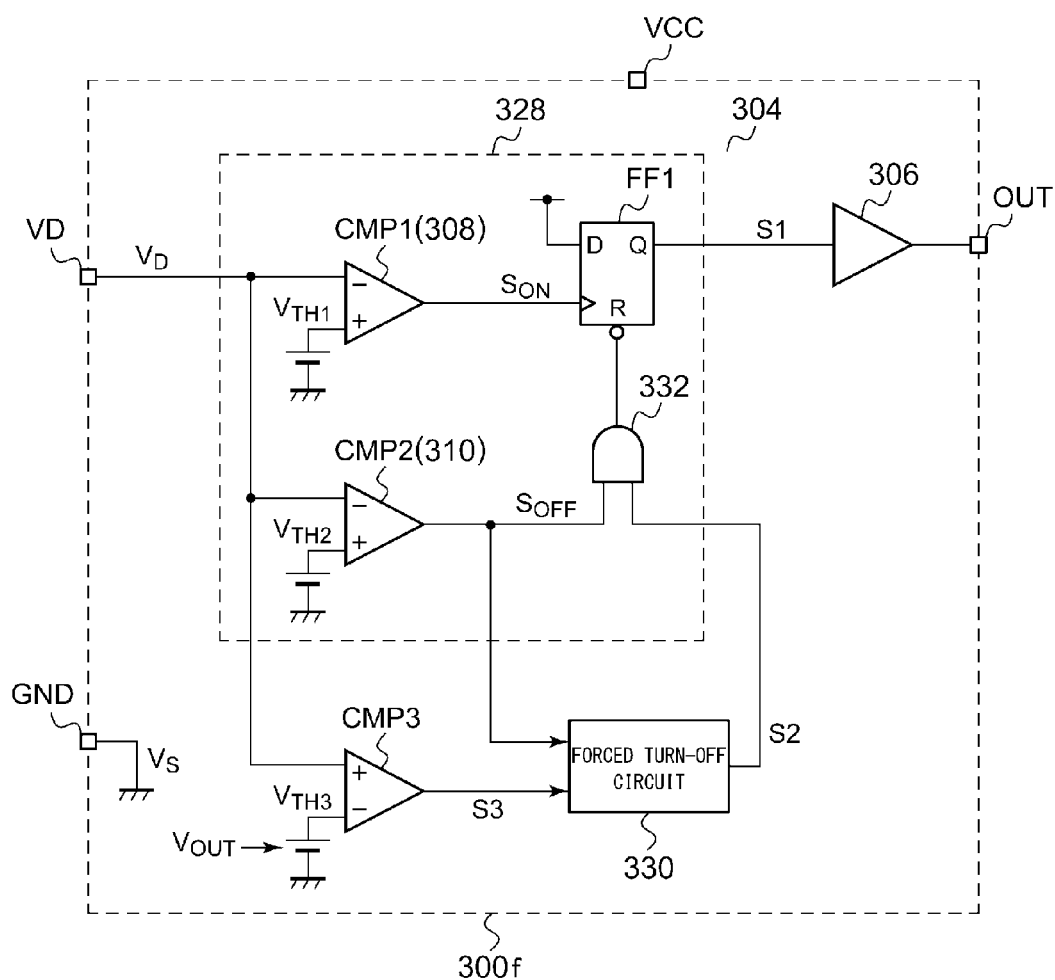
FIG. 14 is a circuit diagram showing a secondary-side controller according to a second example configuration.

FIG. 14 is a circuit diagram showing a secondary-side controller 300f according to a second example configuration.

The secondary-side controller 300f further includes a third comparator CMP3 in addition to the configuration of the secondary-side controller 300e shown in FIG. 13. The third comparator CMP3 compares the drain-source voltage $V_{DS}$ of the synchronous rectification transistor with a predetermined positive third threshold voltage $V_{TH3}$. When the output S3 of the third comparator CMP3 indicates that the drain-source voltage $V_{DS}$ crosses the third threshold voltage $V_{TH3}$, the time measurement operation of the forced turn-off circuit 330 is reset.

The third threshold voltage $V_{TH3}$ is preferably generated based on the output voltage $V_{OUT}$. Specifically, the third threshold voltage $V_{TH3}$ is set to the output voltage $V_{OUT}$ or otherwise a value in the vicinity of the output voltage $V_{OUT}$. Also, the third threshold voltage $V_{TH3}$ may be configured as a voltage that is offset with respect to the output voltage $V_{OUT}$.

Figure 15:
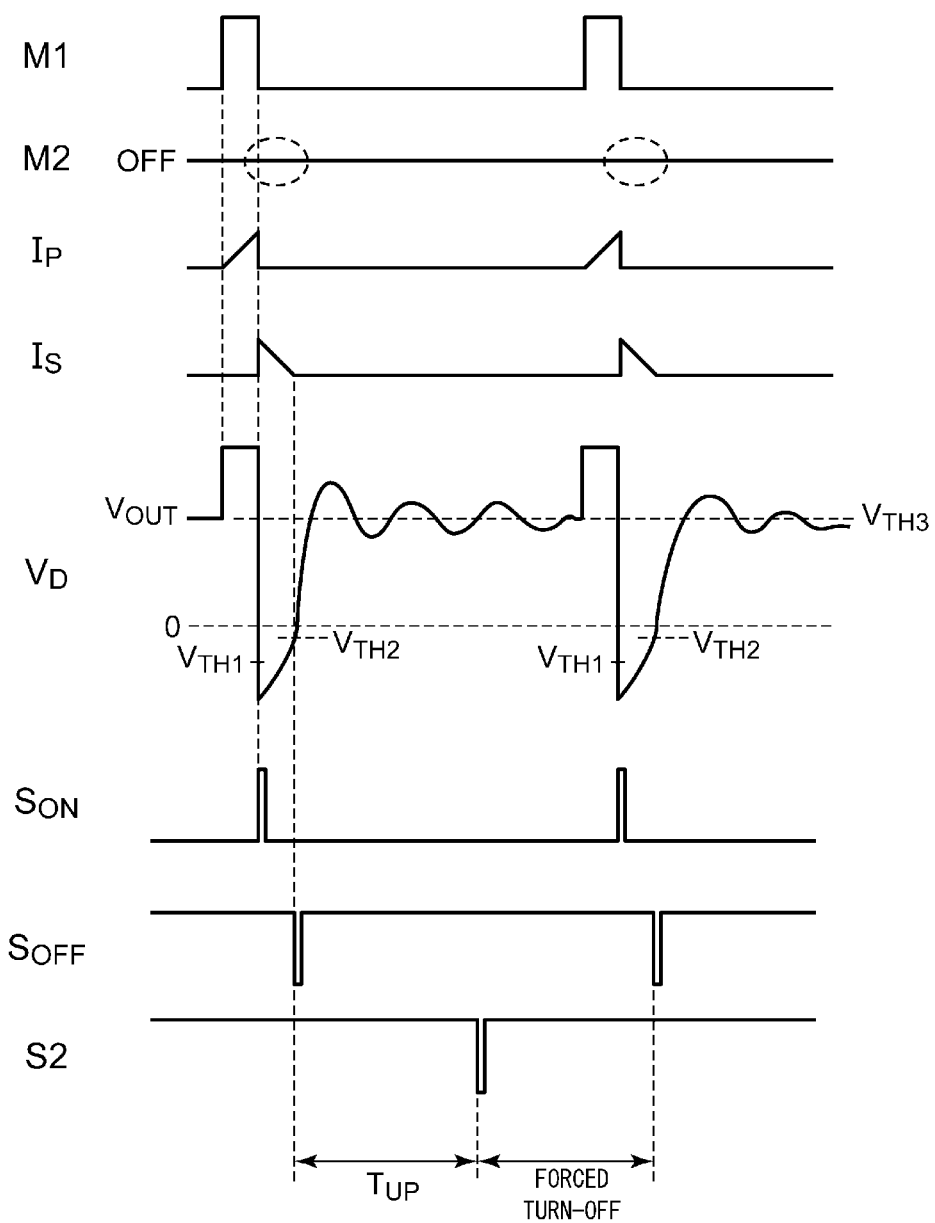
FIG. 15 is a diagram for describing the problems that can occur in the secondary-side controller shown in FIG. 13.

The secondary-side controller 300f shown in FIG. 14 is capable of solving a problem that can occur in the secondary-side controller 300e shown in FIG. 13. First, description will be made regarding the problem. FIG. 15 is a diagram for describing such a problem that can occur in the secondary-side controller 300e shown in FIG. 13. In some cases, as the load current $I_{OUT}$ becomes smaller, the primary-side controller 202 of the DC/DC converter 200 reduces the switching frequency $f_{SW}$ so as to reduce its switching loss, thereby providing improved efficiency. In a case of employing a combination of such a primary-side controller 202 and the secondary-side controller 300e shown in FIG. 13, such an arrangement is not capable of turning on the synchronous rectification transistor M2 when the DC/DC converter 200 operates in the discontinuous mode in a low range of the switching frequency $f_{SW}$, i.e., in a state in which the switching transistor M1 switches on and off with a long switching period. That is to say, in this state, the synchronous rectification transistor M2 operates in the diode rectification mode.

The secondary-side controller 300e shown in FIG. 13 uses the output $S_{OFF}$ of the second comparator CMP2 in order to detect whether or not the switching transistor M1 turns on. In the continuous mode, as a result of turning on the switching transistor M1, the secondary current $I_S$ becomes zero. Thus, the time point at which the reset signal $S_{OFF}$ transits indicates that the switching transistor M1 turns on. However, in the discontinuous mode, the secondary current $I_S$ becomes zero before the switching transistor M1 turns on. Accordingly, the time point at which the reset signal $S_{OFF}$ is asserted does not match the time point at which the switching transistor M1 turns on.

When the time-up period $T_{UP}$ elapses after the reset signal $S_{OFF}$ is asserted, the synchronous rectification transistor M2 is forcibly turned off. The state in which the synchronous rectification transistor M2 is forcibly turned off is canceled according to the next assertion of the reset signal $S_{OFF}$. Accordingly, the set signal $S_{ON}$ is asserted in the forced turn-off period. Thus, the pulse signal S1 is maintained at the low level, leading to a problem in that the synchronous rectification transistor M2 cannot be turned on.

That is to say, such a secondary-side controller 300e has a problem in that, in some cases, in the discontinuous mode, the synchronous rectification transistor M2 cannot be switched on and off, i.e., it operates in the diode rectification mode alone.

Figure 16:
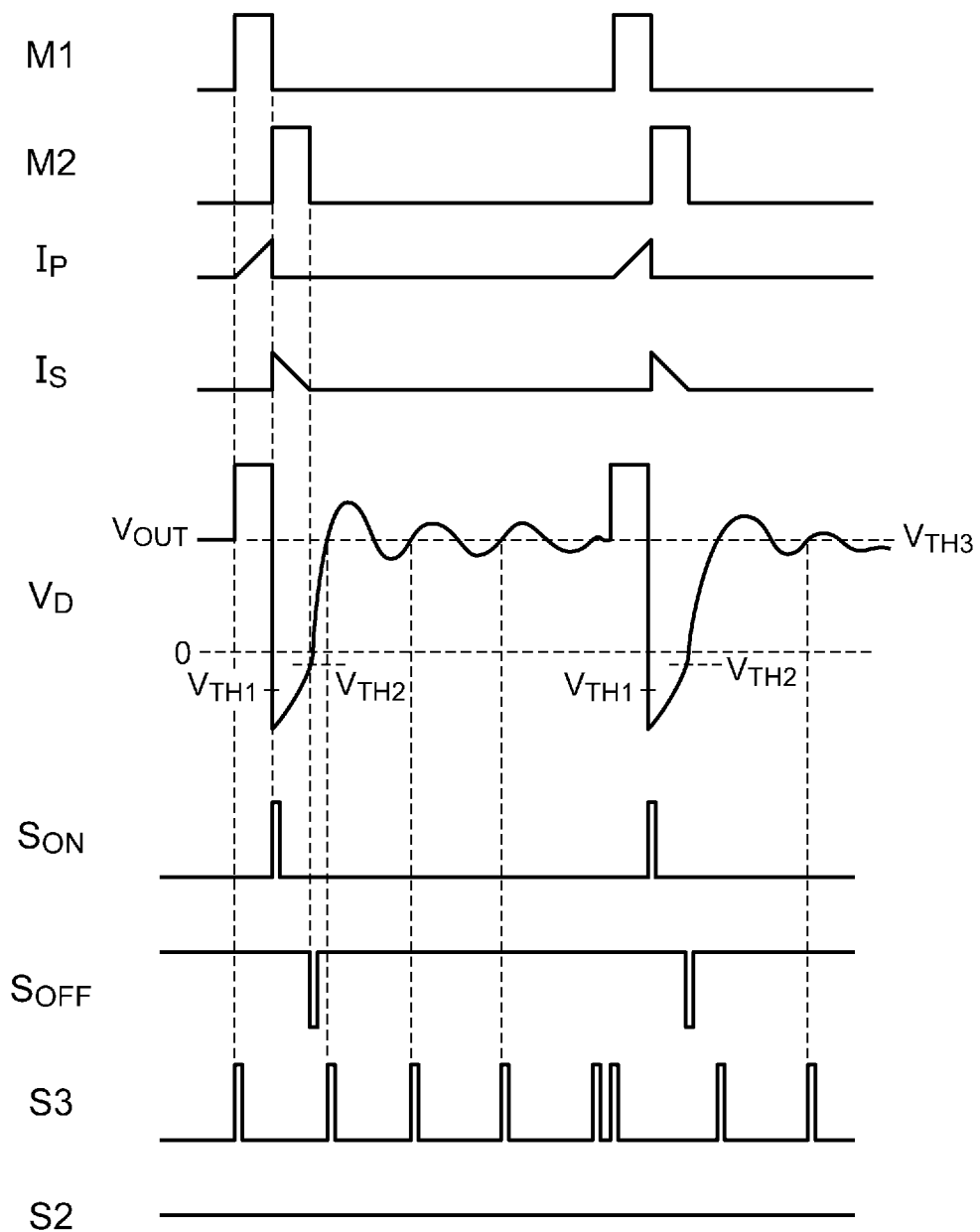
FIG. 16 is an operation waveform diagram showing the operation of the secondary-side controller shown in FIG. 14 in the discontinuous mode.

The secondary-side controller 300f shown in FIG. 14 is capable of solving such a problem. FIG. 16 is an operation waveform diagram showing the operation of the secondary-side controller 300f shown in FIG. 14 when it operates in the discontinuous mode. When the synchronous rectification transistor M2 turns off in the discontinuous mode, the drain voltage $V_D$ rises. Subsequently, damped oscillation occurs in the drain voltage $V_D$ with the output voltage $V_{OUT}$ as the center of oscillation. During the damped oscillation, crossing of the threshold voltage $V_{TH3}$ by the drain voltage $V_D$ repeatedly occurs. The time measurement operation of the forced turn-off circuit 330 is reset every time the drain voltage $V_D$ crosses the threshold voltage $V_{TH3}$. Accordingly, in this case, the forced turn-off signal S2 is not asserted. Thus, such an arrangement is capable of maintaining a synchronous rectification operation, i.e., of ensuring the switching operation of the synchronous rectification transistor M2, even if it operates in the discontinuous mode.

Figure 17A:
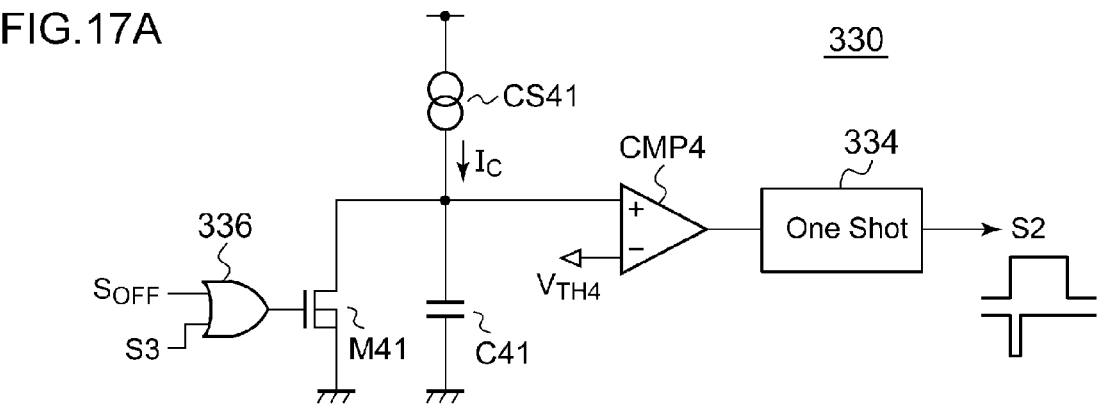
FIG. 17A is a circuit diagram showing an example configuration of a forced turn-off circuit.

FIG. 17A is a circuit diagram showing an example configuration of the forced turn-off circuit 330. The forced turn-off circuit 330 is configured as an analog timer circuit including a capacitor C41, a current source CS41, a discharger circuit M41, a fourth comparator CMP4, and a one-shot circuit 334. The current source CS41 supplies a current $I_C$ to the capacitor C41. The discharger circuit M41 discharges the capacitor C41 in response to the reset signal $S_{OFF}$ so as to reset the time measurement operation. For example, the discharger circuit M41 may be configured as a transistor. The fourth comparator CMP4 compares a voltage $V_{C41}$ across the capacitor C41 with a predetermined fourth threshold voltage $V_{TH4}$. The one-shot circuit 334 outputs the forced turn-off signal S2 which is set to a low level (asserted) for a predetermined time period when the voltage $V_{C41}$ across the capacitor C41 exceeds the fourth threshold voltage $V_{TH4}$.

In the secondary-side controller 300f shown in FIG. 14, the discharger circuit M41 is configured such that, when at least one from among the reset signal $S_{OFF}$ and the output S3 of the third comparator CMP3 is asserted, the discharger circuit M41 discharges the capacitor C41 so as to reset the time measurement operation. In order to provide such an operation, an OR gate 336 may be provided.

Figure 17B:
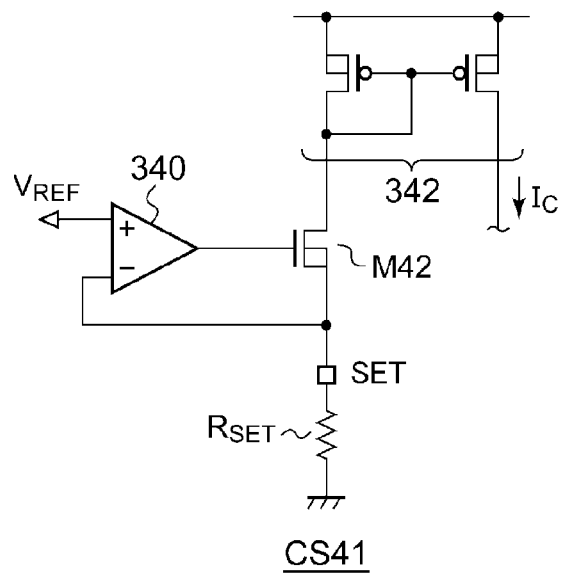
FIG. 17B is a circuit diagram showing a current source shown in FIG. 17A.

FIG. 17B is a circuit diagram showing the current source CS41 shown in FIG. 17A. The current source CS41 includes a transistor M42, an operational amplifier 340, a resistor $R_{SET}$ connected as an external component to the SET terminal, and a current mirror circuit 342. A current $V_{REF}/R_{SET}$ that corresponds to the external resistor $R_{SET}$ flows through the transistor M42. The current mirror circuit 342 mirrors the current $V_{REF}/R_{SET}$, and supplies the mirror current thus generated to the capacitor C41. Such a configuration allows the time-up period $T_{UP}$ for the forced turn-off circuit 330 to be set according to the resistor $R_{SET}$. The aforementioned abnormal state detection circuit 320 monitors whether or not an open circuit or a short circuit has occurred in the SET terminal.

The forced turn-off circuit 330 may be configured as a digital timer employing a counter instead of such an analog timer.

[Usage]

Next, description will be made regarding the usage of the DC/DC converter 200 described in the embodiment.

Figure 18:
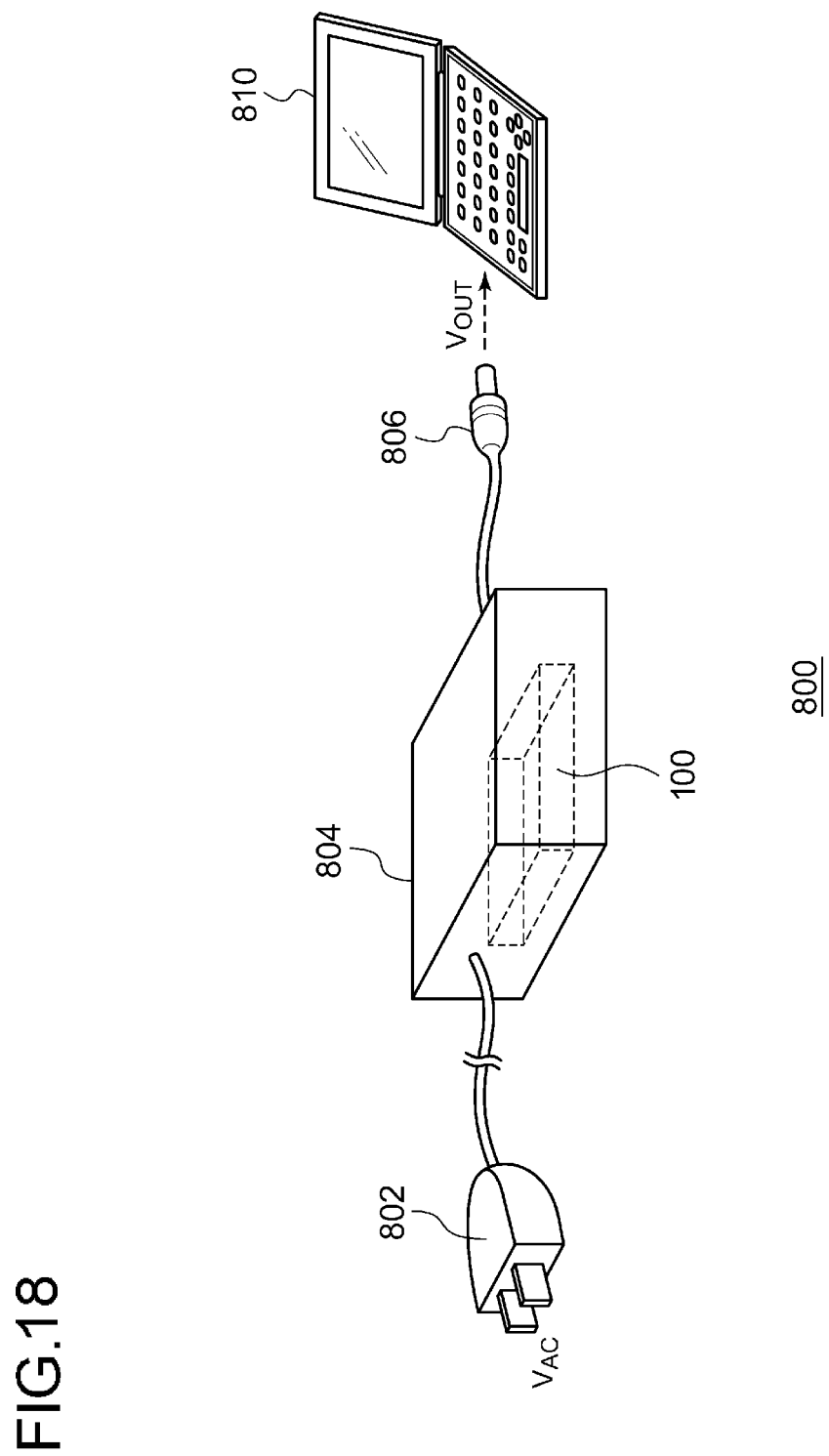
FIG. 18 is a diagram showing an AC adapter including an AC/DC converter.

FIG. 18 is a diagram showing an AC adapter 800 including the AC/DC converter 100. The AC adapter 800 includes a plug 802, a housing 804, and a connector 806. The plug 802 receives a commercial AC voltage $V_{AC}$ from an unshown electrical outlet. The AC/DC converter 100 is mounted within the housing 804. The DC output voltage $V_{OUT}$ generated by the AC/DC converter 100 is supplied from the connector 806 to an electronic device 810. Examples of such an electronic device 810 include laptop PCs, digital still cameras, digital video cameras, cellular phones, portable audio players, and the like.

Figure 19A:
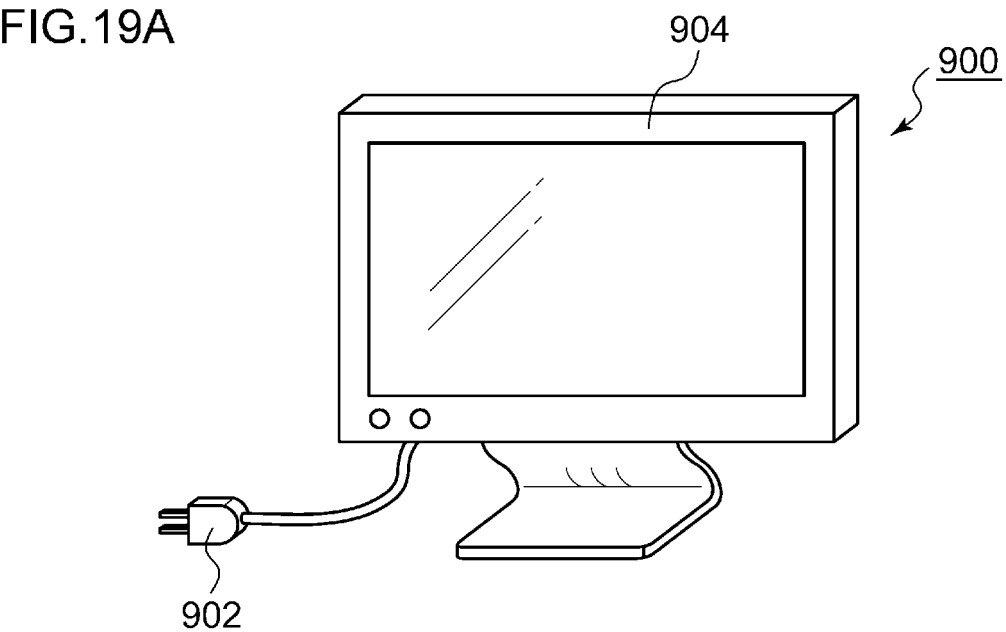
FIGS. 19A and 19B are diagrams each showing an electronic device including an AC/DC converter.
Figure 19B:
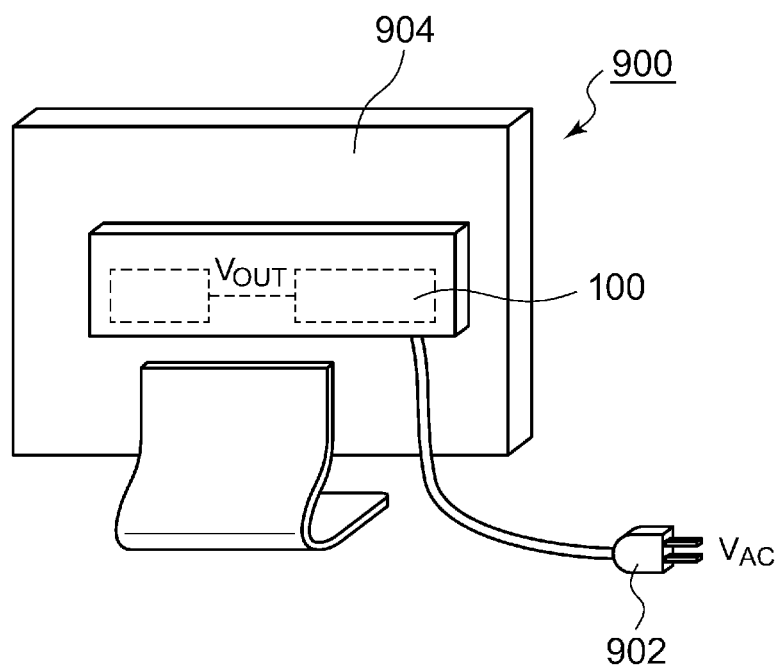

FIGS. 19A and 19B are diagrams each showing an electronic device 900 including the AC/DC converter 100. The electronic device 900 shown in FIGS. 19A and 19B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 receives commercial AC voltage $V_{AC}$ from an unshown electrical outlet. The AC/DC converter 100 is mounted within the housing 904. The DC output voltage $V_{OUT}$ generated by the AC/DC converter 100 is supplied to loads mounted within the same housing 904, examples of which include a microcomputer, DSP (Digital Signal Processor), power supply circuit, illumination device, analog circuit, digital circuit, etc.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Figure 20:
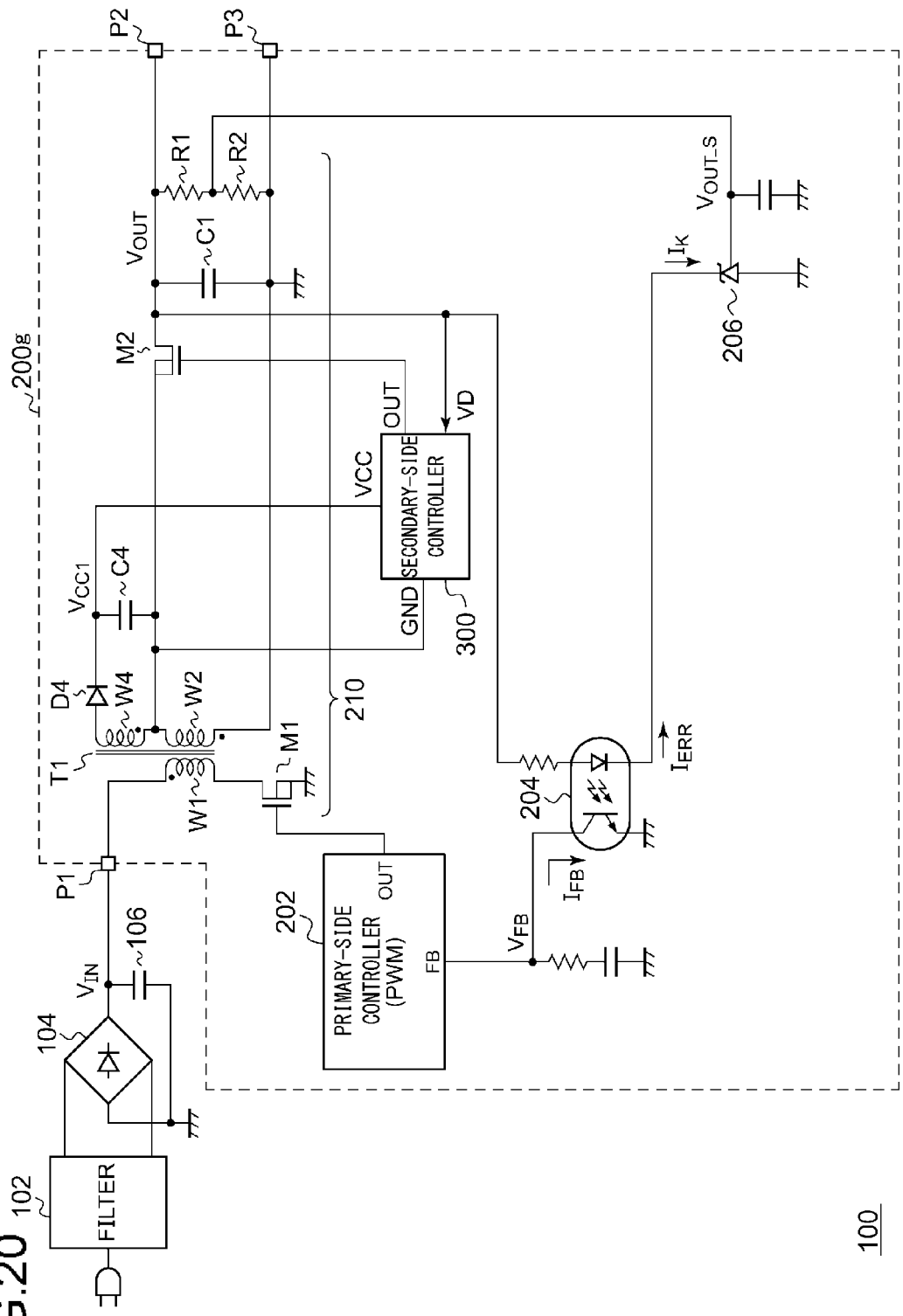
FIG. 20 is a circuit diagram showing a DC/DC converter.

Description has been made in the embodiments regarding an arrangement in which the synchronous rectification transistor M2 is arranged on a side where its electric potential is lower than that at the primary winding W1. Also, the synchronous rectification transistor M2 may be arranged on a side that is closer to the output terminal P2. FIG. 20 is a circuit diagram showing a DC/DC converter 200g. It should be noted that the SET terminal and the FAIL terminal are not shown.

An auxiliary winding W4 of a transformer T1, a diode D4, and a capacitor C4 form an auxiliary converter that generates a DC voltage $V_{CC1}$ that is higher than the output voltage $V_{OUT}$. The DC voltage $V_{CC1}$ is supplied to the VCC terminal. The GND terminal of the secondary-side controller 300 is connected to the source of the synchronous rectification transistor M2. The secondary-side controller 300 has the same configuration as those described in the embodiments. Such a modification provides the same effects as those provided by the embodiment.

[Second Modification]

Figure 21:
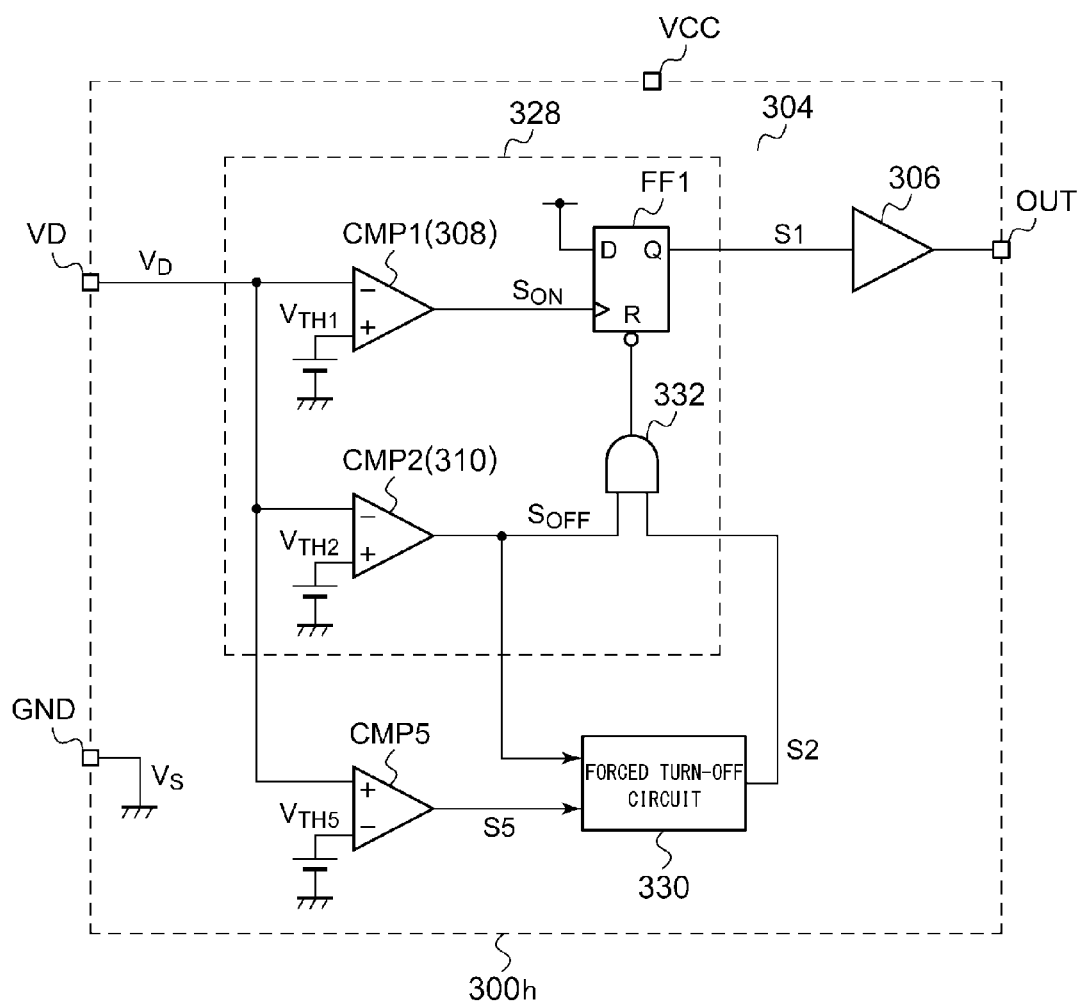
FIG. 21 is a circuit diagram showing a secondary-side controller according to a second modification.

FIG. 21 is a circuit diagram showing a secondary-side controller 300h according to a second modification. The secondary-side controller 300h includes a turn-on detection circuit 350 that detects whether or not the switching transistor M1 turns on. The turn-on detection circuit 350 includes a fifth comparator CMP5 that compares the voltage $V_{DS}$ across both terminals of the synchronous rectification transistor M5 with a fifth threshold voltage $V_{TH5}$. When the voltage $V_{DS}$ across both terminals of the synchronous rectification transistor M5 crosses the fifth threshold voltage $V_{TH5}$, the turn-on detection circuit 350 asserts a turn-on detection signal S5 which indicates that the switching transistor M1 turns on.

The threshold voltage $V_{TH5}$ is preferably set to a voltage in the vicinity of the output voltage $V_{OUT}$ in the same manner as the third threshold voltage $V_{TH3}$. Such an arrangement is capable of detecting a rise of the drain voltage $V_D$ that occurs accompanying the turn-on of the switching transistor M1, thereby detecting whether or not the switching transistor M1 turns on. It should be noted that, in a case in which the fifth threshold voltage $V_{TH5}$ is set to the same level as that of the second threshold voltage $V_{TH2}$, the secondary-side controller 300h provides the same operation as that shown in FIG. 13.

[Third Modification]

Description has been made in the embodiment regarding a flyback converter. Also, the present invention is applicable to a forward converter. In this case, multiple synchronous rectification transistors are arranged on the secondary side of the transformer T1. The secondary-side controller may be configured to switch on and off the multiple synchronous rectification transistors. Also, such a converter may be configured as a quasi-resonant converter.

[Fourth Modification]

Description has been made in the embodiments regarding an arrangement in which the resistor $R_{SET}$ is connected to the SET terminal. Also, another kind of circuit element such as a capacitor or the like may be connected to the SET terminal.

[Fifth Modification]

Description has been made in the embodiments regarding the abnormal state detection circuit 320 that is capable of detecting both an open-circuit fault and a short-circuit fault that can occur in the SET terminal. Also, in a case in which there is no need for concern about an open-circuit fault, the abnormal state detection circuit 320 may detect only whether or not a short-circuit fault has occurred. Conversely, in a case in which there is no need for concern about a short-circuit fault, the abnormal state detection circuit 320 may detect only whether or not an open-circuit fault has occurred.

[Sixth Modification]

At least one of the switching transistor or the synchronous rectification transistor may be configured as a bipolar transistor or an IGBT.

While the preferred embodiments of the present invention have been described using specific terms, such description is for illustrative purposes only, and it is to be understood that changes and variations may be made without departing from the spirit or scope of the appended claims.

What is claimed is:

1. A secondary-side controller structured to form an insulated synchronous rectification DC/DC converter in combination with a switching transistor provided on a primary side, a primary-side controller provided on the primary side and structured to control the switching transistor, and a synchronous rectification transistor provided on a secondary-side, the secondary-side controller comprising:
a set terminal to be coupled in use to an external circuit element;
a synchronous rectification controller structured to generate a pulse signal based on a control time determined according to a state of the set terminal;
a driver structured to switch on and off the synchronous rectification transistor according to the pulse signal;

an abnormal state detection circuit structured to detect an open-circuit state and/or a short-circuit state that can occur in the set terminal, and to assert a detection signal upon detection of such an open-circuit state and/or a short-circuit state;

a fail terminal to be coupled to an input side of a fail notification photocoupler; and a fail circuit structured to drive the fail notification photocoupler in response to the assertion of the detection signal, wherein, the secondary-side controller is coupled to transmit an assertion of the detection signal to the primary side controller via the fail notification photocoupler so as to instruct the primary-side controller to suspend a switching operation of the switching transistor.

2. The secondary-side controller according to claim 1, wherein an external resistor is connected in use to the set terminal, and wherein the abnormal state detection circuit comprises:

a first capacitor;

a charger circuit that charges the first capacitor using a first current that is inversely proportional to a resistance value of the external resistor;

a discharger circuit that discharges the first capacitor with a predetermined second current; and an open circuit detection comparator that compares a voltage across the first capacitor with a threshold voltage set for detecting an open circuit.

3. The secondary-side controller according to claim 2, wherein the abnormal state detection circuit further comprises a short circuit detection comparator structured to compare a voltage at the set terminal with a threshold voltage set for detecting a short circuit.

4. The secondary-side controller according to claim 1, wherein, when the detection signal remains in an asserted state for a predetermined period of time, the fail circuit drives the fail notification photocoupler.

5. The secondary-side controller according to claim 4, wherein the fail circuit comprises:

a second capacitor;

a current source structured to charge the second capacitor;

a discharger transistor arranged in parallel with the second capacitor, and structured to be turned on when the detection signal is negated; and a voltage comparator structured to assert a fail signal when a voltage across the second capacitor exceeds a threshold voltage, and wherein the secondary-side controller drives the fail notification photocoupler, in response to an assertion of the fail signal.

6. The secondary-side controller according to claim 5, wherein, when the fail signal is consecutively asserted a predetermined number of times, the fail circuit drives the fail notification photocoupler.

7. The secondary-side controller according to claim 1, wherein the synchronous rectification controller further comprises:

a pulse generator structured to generate the pulse signal based on a voltage across the synchronous rectification transistor, that to set the pulse signal to an on level configured as an instruction to turn on the synchronous rectification transistor when the turn-off of the switching transistor is detected, and to set the pulse signal to an off level configured as an instruction to turn off the synchronous rectification transistor when it is detected that a current that flows through a secondary winding of a transformer becomes substantially zero;

and a forced turn-off circuit structured to forcibly turn off the synchronous rectification transistor after a predetermined time-up period elapses after the turn-on of the switching transistor is detected, and wherein the control time is configured as the time-up period.

8. The secondary-side controller according to claim 7, wherein, after the time-up period elapses after the turn-on of the switching transistor is detected, the forced turn-off circuit switches the pulse signal to the off level.

9. The secondary-side controller according to claim 7, wherein the pulse generator comprises:

a set signal generating unit that generates a set signal which is asserted when the turn-off of the switching transistor is detected;

a reset signal generating unit that generates a reset signal which is asserted when it is detected that the current that flows through the secondary winding of the transformer becomes substantially zero; and a flip-flop that generates the pulse signal which is switched to an on level when the set signal is asserted, and which is switched to an off level when the reset signal is asserted.

10. The secondary-side controller according to claim 9, wherein the forced turn-off circuit generates a forced turn-off signal which is asserted after the time-up period elapses after the turn-on of the switching transistor is detected, and wherein, when at least one from among the reset signal and the forced turn-off signal is asserted, the flip-flop sets the pulse signal to an off level.

11. The secondary-side controller according to claim 9, wherein, when the reset signal is asserted, the forced turn-off circuit starts time measurement.

12. The secondary-side controller according to claim 1, monolithically integrated on a single semiconductor substrate.

13. The insulated synchronous rectification DC/DC converter comprising:

a transformer comprising a primary winding and a secondary winding;

the switching transistor connected to the primary winding of the transformer;

the synchronous rectification transistor connected to the secondary winding of the transformer;

a feedback photocoupler;

a shunt regulator that is connected to an input side of the feedback photocoupler, and that generates an error current that corresponds to an output voltage of the DC/DC converter;

the primary-side controller that is connected to an output side of the feedback photocoupler, and that switches on and off the switching transistor according to a feedback signal received from the feedback photocoupler; and the secondary-side controller according to claim 1, that controls the synchronous rectification transistor.

14. A power supply apparatus comprising:

a filter that filters a commercial AC voltage;

a diode rectifier circuit that full-wave rectifies an output voltage of the filter;

a smoothing capacitor that smoothes an output voltage of the diode rectifier circuit so as to generate a DC input voltage; and the DC/DC converter according to claim 13, that steps down the DC input voltage, and that supplies the DC input voltage thus stepped down to a load.

15. An electronic device comprising:
a load;
a filter that filters a commercial AC voltage;
a diode rectifier circuit that full-wave rectifies an output voltage of the filter;
a smoothing capacitor that smoothes an output voltage of the diode rectifier circuit so as to generate a DC input voltage; and
the DC/DC converter according to claim 13, that steps down the DC input voltage, and that supplies the DC input voltage thus stepped down to the load.

16. A power supply adapter comprising:
a filter that filters a commercial AC voltage;
a diode rectifier circuit that full-wave rectifies an output voltage of the filter;
a smoothing capacitor that smoothes an output voltage of the diode rectifier circuit so as to generate a DC input voltage; and
the DC/DC converter according to claim 13, that steps down the DC input voltage, and that supplies the DC input voltage thus stepped down to a load.

17. The secondary-side controller according to claim 1, further comprising:
a shunt regulator output terminal to be coupled to an input side of a feedback photocoupler; and
a shunt regulator structured to generate an error current that corresponds to an output voltage of the DC/DC converter, and to supply the error current to the feedback photocoupler,
wherein the primary-side controller is structured to feedback-control the switching transistor based on a state of the feedback photocoupler.

18. The secondary-side controller according to claim 17, wherein the shunt regulator output terminal and the fail terminal are adjacent.

19. The secondary-side controller according to claim 17, wherein the shunt regulator output terminal and the fail terminal are provided along one side of a package of the secondary-side controller.

20. A secondary-side controller structured to form an insulated synchronous rectification DC/DC converter in combination with a switching transistor provided on a primary side, a primary-side controller provided on the primary side and structured to control the switching transistor, and a synchronous rectification transistor provided on a secondary-side,
the secondary-side controller comprising:
a set terminal to be coupled in use to an external circuit element;
a synchronous rectification controller structured to generate a pulse signal based on a control time determined according to a state of the set terminal;
a driver structured to switch on and off the synchronous rectification transistor according to the pulse signal;
an abnormal state detection circuit structured to detect an open-circuit state and/or a short-circuit state that can occur in the set terminal, and to assert a detection signal upon detection of such an open-circuit state and/or a short-circuit state;
a shunt regulator output terminal to be coupled to an input side of a feedback photocoupler;
a shunt regulator structured to generate an error current that corresponds to an output voltage of the DC/DC converter, and to supply the error current to the feedback photocoupler; and
a fail circuit structured to drive the feedback photocoupler in response to the assertion of the detection signal,
wherein the secondary-side controller is coupled to transmit an assertion of the detection signal to the primary side controller via the feedback photocoupler so as to instruct the primary-side controller to suspend a switching operation of the switching transistor, and to transmit a feedback signal used in the switching operation of the switching transistor.

21. A secondary-side controller structured to form an insulated synchronous rectification DC/DC converter in combination with a switching transistor provided on a primary side, a primary-side controller provided on the primary side and structured to control the switching transistor, and a synchronous rectification transistor provided on a secondary-side,
the secondary-side controller comprising:
a first comparator structured to compare a voltage across the synchronous rectification transistor with a first threshold voltage, and to assert a set signal when the voltage across the synchronous rectification transistor becomes lower than the first threshold voltage;
a second comparator structured to compare the voltage across the synchronous rectification transistor with a second threshold voltage, and to assert a reset signal when the voltage across the synchronous rectification transistor becomes higher than the second threshold voltage;
a flip-flop structured to generate a pulse signal which is switched to an on level in response to an assertion of the set signal, and which is switched to an off level in response to an assertion of the reset signal;
a forced turn-off circuit structured to forcibly turn off the synchronous rectification transistor after a predetermined time-up period elapses after the assertion of the reset signal;
a set terminal to be coupled to an external circuit element so as to determine the time-up period based on a circuit constant of the circuit element; and
an abnormal state detection circuit structured to detect an open-circuit state and/or a short-circuit state that can occur in the set terminal, and to assert a detection signal upon detection of such an open-circuit state and/or short-circuit state,
wherein the secondary-side controller is coupled to transmit an assertion of the detection signal to the primary side controller via a photocoupler so as to instruct the primary-side controller to suspend a switching operation of the switching transistor.

22. The secondary-side controller according to claim 21, wherein the forced turn-off circuit is structured to generate a forced turn-off signal which is asserted after the time-up period elapses after the assertion of the reset signal,
and wherein, when at least one from among the reset signal and the forced turn-off signal is asserted, the flip-flop switches the pulse signal to an off level.

23. The secondary-side controller according to claim 21, further comprising a third comparator structured to compare a voltage across the synchronous rectification transistor with a third threshold voltage configured as a predetermined positive voltage, wherein, when the voltage across the synchronous rectification transistor crosses the third threshold voltage, the time measurement operation of the forced turn-off circuit is reset.

* * * * *